United States Patent
Kim et al.

(10) Patent No.: US 10,051,661 B2
(45) Date of Patent: Aug. 14, 2018

(54) METHOD AND APPARATUS FOR COMMUNICATING USING UNLICENSED BANDS IN MOBILE COMMUNICATION SYSTEM

(71) Applicant: Samsung Electronics Co., Ltd, Gyeonggi-do (KR)

(72) Inventors: Sung-Hoon Kim, Suwon-si (KR); Young-Kyo Baek, Seoul (KR); Kyeong-In Jeong, Yongin-si (KR); Sang-Bum Kim, Suwon-si (KR); Woo-Seong Kim, Gwacheon-si (KR); Soeng-Hun Kim, Suwon-si (KR); Jae-Hyuk Jang, Suwon-si (KR); Gert Jan Van Lieshout, Staines (GB)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 14/841,029

(22) Filed: Aug. 31, 2015

(65) Prior Publication Data
US 2016/0066325 A1   Mar. 3, 2016

Related U.S. Application Data

(60) Provisional application No. 62/044,041, filed on Aug. 29, 2014.

(51) Int. Cl.
*H04W 74/08* (2009.01)
*H04W 72/12* (2009.01)
*H04W 84/12* (2009.01)

(52) U.S. Cl.
CPC ... *H04W 74/0816* (2013.01); *H04W 72/1215* (2013.01); *H04W 84/12* (2013.01)

(58) Field of Classification Search
None
See application file for complete search history.

(56) References Cited

U.S. PATENT DOCUMENTS

| 2010/0091716 A1 | 4/2010 | Bonta et al. |
| 2012/0077510 A1 | 3/2012 | Chen et al. |

(Continued)

FOREIGN PATENT DOCUMENTS

| KR | 20150010434 A | 1/2015 |
| WO | WO 2013/013409 | 1/2013 |

(Continued)

OTHER PUBLICATIONS

International Search Report and Written Opinion issued for PCT/KR2015/009128 dated Dec. 23, 2015, 10 pgs.

*Primary Examiner* — Kibrom T Hailu

(57) ABSTRACT

The present disclosure relates to a communication method and system for converging a $5^{th}$-Generation (5G) communication system for supporting higher data rates beyond a 4G system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for performing communication using an unlicensed band includes reserving a channel of the unlicensed band using a control frame supporting WLAN by a WLAN module, when reserving the channel of the unlicensed band succeeds, determining whether the channel of the unlicensed band is used by a mobile communication module, and transmitting data supporting the unlicensed band through the reserved channel of the unlicensed band.

20 Claims, 19 Drawing Sheets

(56) References Cited

U.S. PATENT DOCUMENTS

| | | |
|---|---|---|
| 2013/0077554 A1 | 3/2013 | Gauvreau et al. |
| 2013/0188552 A1* | 7/2013 | Kazmi .................. H04L 5/001 370/315 |
| 2014/0287769 A1* | 9/2014 | Taori ................ H04W 74/0808 455/450 |
| 2014/0295815 A1 | 10/2014 | Cho et al. |
| 2015/0334752 A1* | 11/2015 | Li ..................... H04W 74/0816 455/418 |
| 2015/0351095 A1* | 12/2015 | Wilhelmsson .... H04W 72/0453 370/329 |
| 2016/0037490 A1* | 2/2016 | Pazhyannur ......... H04W 16/14 370/329 |
| 2016/0338019 A1* | 11/2016 | Ratasuk ................ H04L 5/001 |

FOREIGN PATENT DOCUMENTS

| | | |
|---|---|---|
| WO | WO 2013/087835 | 6/2013 |
| WO | WO 2013/133663 A1 | 9/2013 |

* cited by examiner

METHOD AND APPARATUS FOR COMMUNICATING USING UNLICENSED BANDS IN MOBILE COMMUNICATION SYSTEM

CROSS-REFERENCE TO RELATED APPLICATION AND CLAIM OF PRIORITY

The present application is related to and claims the benefit under 35 U.S.C. § 119(a) of a U.S. patent application filed in the United States Patent and Trademark Office on Aug. 29, 2014 and assigned Ser. No. 62/044,041, the entire disclosure of which is incorporated herein by reference.

TECHNICAL FIELD

The present disclosure relates to methods and apparatuses and methods for performing communication using unlicensed bands in wireless communication systems.

BACKGROUND

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post long term evolution (LTE) system. For higher data transmit rates, 5G communication systems are considered to be implemented on ultra high frequency bands (mmWave), such as, e.g., 60 GHz. To mitigate path-loss on the ultra high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna. Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation. There are also other various schemes under development for the 5G system including, e.g., hybrid frequency shift keying (FSK) and quadrature amplitude modulation (QAM) modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet is evolving from the human-centered connection network by which humans create and consume information to the Internet of things (IoT) network by which information is communicated and processed between things or other distributed components. Another arising technology is the Internet of everything (IoE), which is a combination of the Big data processing technology and the IoT technology through, e.g., a connection with a cloud server. To implement the IoT, technology elements, such as a sensing technology, wired/wireless communication and network infra, service interface technology, and a security technology, are required. There is a recent ongoing research for inter-object connection technologies, such as the sensor network, machine-to-machine (M2M), or the machine-type communication (MTC). In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, health-care, or smart appliance industry, or state-of-art medical services, through conversion or integration of existing information technology (IT) techniques and various industries.

Thus, there are various ongoing efforts to apply the 5G communication system to the IoT network. For example, the sensor network, machine-to-machine (M2M), machine type communication (MTC), or other 5G techniques are implemented by schemes, such as beamforming, multi-input multi-output (MIMO), and array antenna schemes. The above-mentioned application of the cloud radio access network (RAN) as a Big data processing technique may be said to be an example of the convergence of the 5G and IoT technologies.

In general, the mobile communication system has been developed to offer communication services while securing users' mobility. The sharp development of technology brought the mobile communication system to the stage of being able to offer high-speed data communication services as well as voice communication services.

Meanwhile, the 3rd generation partnership project (3GPP) is nowadays standardizing the LTE system as a next-generation mobile communication system. The LTE system is a technology for implementing high-speed packet-based communication to provide a transmission speed up to 100 Mbps that is higher than the data transmission rate being presently served.

Under vigorous discussion is the LTE-advanced (LTE-A) system that comes with various state-of-art technologies to present a further increased data rate. A representative example among the technologies to be newly adopted is carrier aggregation. Carrier aggregation, unlike in the conventional art where a user equipment (UE) performs data communication using only one forward carrier and only one backward carrier, enables one UE to use multiple forward carriers and backward carriers.

The current LTE-A standards define only intra-ENB carrier aggregation. This entails a low chance of applicability of carrier aggregation function, likely causing a failure to aggregate macro cells and pico cells, particularly, in the scenario where multiple pico cells and one macro cell are operated in an overlapping manner. The 3GPP Rel-12 goes on with a study called "small cell enhancement" to address such issues. Representative techniques the study aims to develop include inter-ENB carrier aggregation or dual connectivity technique between heterogeneous base stations (hereinafter, "dual connectivity") that ensures a high data rate for one terminal by combining serving cells dependent upon other base station. Of course, vigorous discussion for other areas such as mobility backup proceeds, but the carrier aggregation technology used to be supported only within the base station is made available between the macro base station and pico or small cell base station, and this would have a significant influence on future communication technologies. Sharply increasing smartphone data usage would exponentially increase small cells to be deployed, and there would be a soring market share of small cell configurations using the legacy remote radio head (RRH) together with small cell base stations that may independently encompass terminals. Thus, when a terminal linked to a small cell receives data transmitted, the terminal may receive other types of data from a macro base station at the same time.

The small cell may operate on a higher frequency band as compared with the legacy macro cell, and the band available for small cells by 3.5 GHz have been already defined in the 3GPP standard. The band features that the available band is broader than the frequency band for the legacy macro cell and presents a poor transmission characteristic due to low transmittance but may enjoy an increased reception gain from a diversity effect obtained using multiple received radio waves coming from reflected waves. The 3.5 GHz band is available in some countries but not in other countries. The latter countries impose the requirement that the band should be dynamically used with a recognitive wireless technique that prevents the terminal or base station from interfering with the use of the band by the higher-priority user. Another noticeable trend is to apply cellular-related techniques for the unlicensed band used by WLAN or small-sized wireless devices, e.g., the LTE system. A need exists for addressing the co-existence issue that may arise due to a difference in operation from the WLAN when the LTE small cell uses the unlicensed band as carrier.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide, for use in a method and apparatus for addressing issues that may occur when a cellular network technique such as LTE using a licensed band makes use of an unlicensed band.

According to an embodiment of the present disclosure, there is provided a method for performing communication using an unlicensed band by a base station in a mobile communication system including a terminal and the base station, the method comprising reserving a channel of the unlicensed band using a control frame supporting a wireless local area network (WLAN) by a WLAN module, when reserving the channel of the unlicensed band succeeds, determining whether the channel of the unlicensed band is used by a mobile communication module; and transmitting data supporting the unlicensed band through the reserved channel of the unlicensed band by the mobile communication module, wherein the base station includes the WLAN module and the mobile communication module.

According to an embodiment of the present disclosure, there is provided an apparatus for performing communication using an unlicensed band by a base station in a mobile communication system including a terminal and the base station comprising a controller reserving a channel of the unlicensed band using a control frame supporting a wireless local area network (WLAN) by a WLAN module, when reserving the channel of the unlicensed band succeeds, determining whether the channel of the unlicensed band is used by a mobile communication module, and a transmitter transmitting data supporting the unlicensed band through the reserved channel of the unlicensed band by the mobile communication module, wherein the base station includes the WLAN module and the mobile communication module.

According to an embodiment of the present disclosure, there is provided a method for performing communication using an unlicensed band by a terminal in a mobile communication system including the terminal and a base station comprising when reserving a channel of the unlicensed band succeeds, receiving data through the reserved channel of the unlicensed band from a mobile communication module of the base station, wherein the channel of the unlicensed band is reserved using a control frame supporting a wireless local area network (WLAN) by a WLAN module of the base station, and wherein the base station includes the WLAN module and the mobile communication module.

According to an embodiment of the present disclosure, there is provided an apparatus for performing communication using an unlicensed band by a terminal in a mobile communication system including the terminal and a base station comprising a receiver, when reserving a channel of the unlicensed band succeeds, receiving data through the reserved channel of the unlicensed band from a mobile communication module of the base station, wherein the channel of the unlicensed band is reserved using a control frame supporting a wireless local area network (WLAN) by a WLAN module of the base station, and wherein the base station includes the WLAN module and the mobile communication module.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10C are views illustrating examples of methods for configuring a subframe for an LTE-U by an SeNB according to embodiments of the present disclosure;

Throughout the drawings, like reference numerals will be understood to refer to like parts, components, and structures.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

The terms or language used herein should not be interpreted as limited as typical ones or ones defined in the dictionary but rather to comply with the technical spirit of the present disclosure based on the doctrine that the inventor may define terms on his own in a proper manner so as to make the disclosure understood in a best way to describe best the disclosure.

When determined to make the subject matter of the present disclosure unclear, the detailed of the known functions or configurations may be skipped. Hereinafter, the present disclosure is described in detail with reference to the accompanying drawings. Before describing the present disclosure, the LTE system and carrier aggregation are briefly described.

Figure 1:
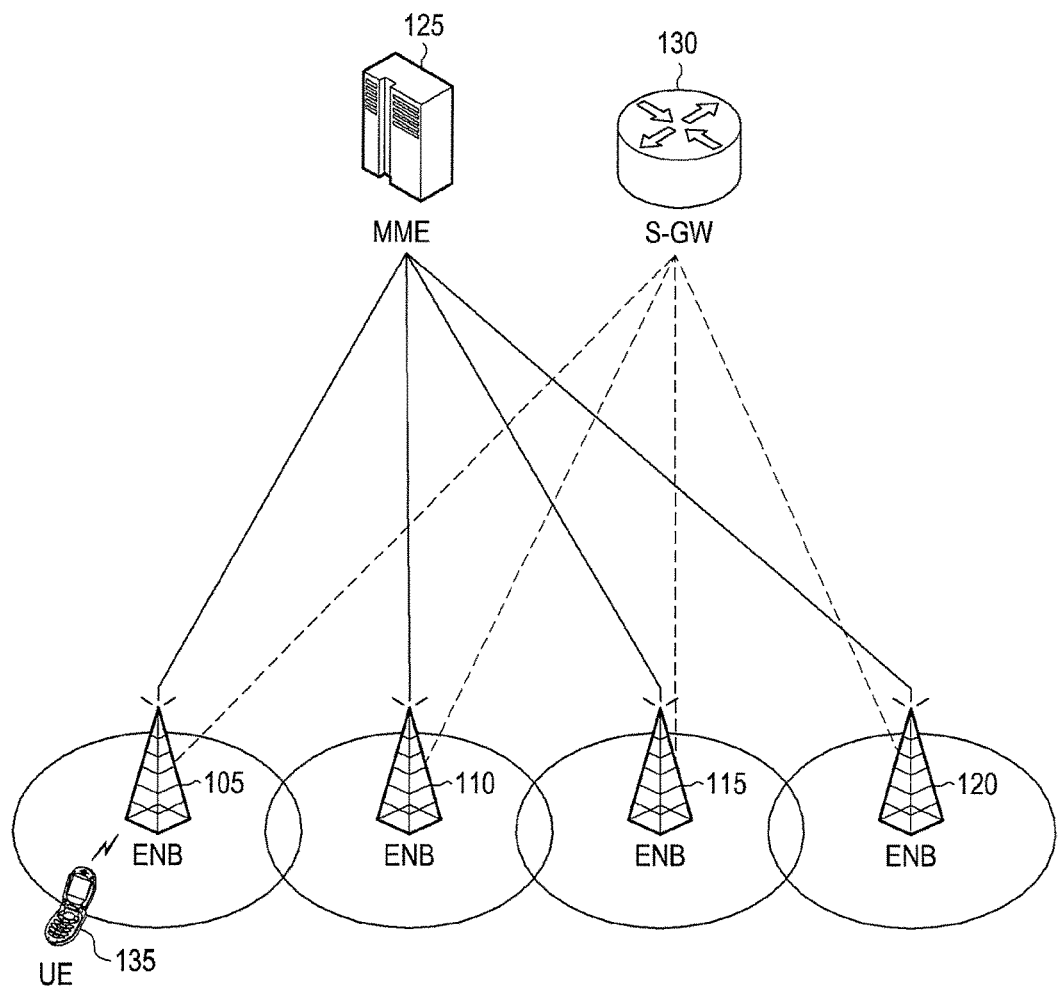
FIG. 1 illustrates an LTE system to which an embodiment of the present disclosure applies.

FIG. 1 is a view illustrating an LTE system to which an embodiment of the present disclosure applies.

Referring to FIG. 1, a radio access network of the LTE system includes next-generation base stations (evolved node B—hereinafter, "ENB" or "base station") 105, 110, 115, and 120, a mobility management entity (MME) 125, and a serving gateway (S-GW) 130.

A user equip equipment (hereinafter, "UE" or "terminal") 135 accesses an external network through the ENB 105, 110, 115, and 120 and the S-GW 130. The ENBs 105, 110, 115, and 120 of FIG. 1 correspond to node Bs in the legacy universal mobile telecommunication system (UMTS) system. The ENB is connected with the UE 135 through a wireless channel and plays a more complicated role than the legacy node B. Since in the LTE system all user traffic as well as real-time services, such as voice over Internet protocol (VoIP) through an Internet protocol is serviced through a shared channel, there is needed an apparatus that performs scheduling by compiling state information, such as UEs' buffer states, available transmit power states, or channel states, and the ENBs 105, 110, 115, and 120 are in charge of the same. One ENB typically controls multiple cells. The LTE system adopts, as a radio access technology, orthogonal frequency division multiplexing (hereinafter, "OFDM") on a 20 MHz bandwidth in order to implement a transmission speed of 100 Mbps. Further, the system applies adaptive modulation & coding (AMC) that determines a modulation scheme and a channel coding rate in compliance with the channel state of the UE. The S-GW 130 is a device providing a data bearer, and the serving gateway 130 generates or removes a data bearer under the control of the MME 125. The MME is an apparatus that is in charge of various control functions as well as mobility management functions for the UE and is connected with multiple base stations.

Figure 2:
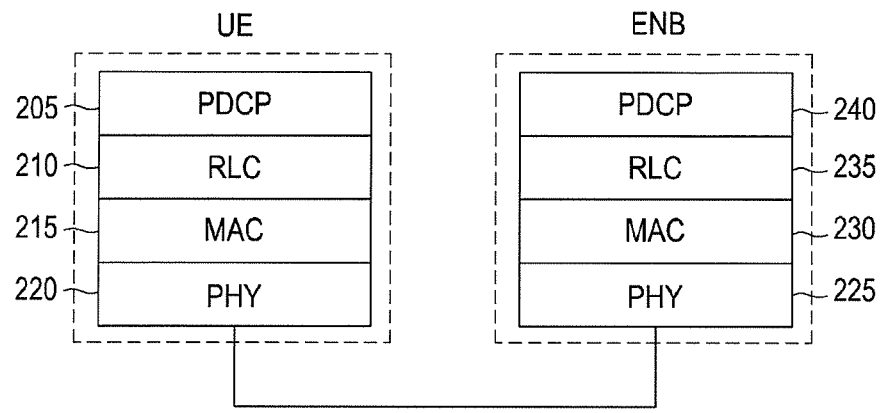
FIG. 2 illustrates a structure of a wireless protocol in an LTE system to which an embodiment of the present disclosure applies.

FIG. 2 illustrates a structure of a wireless protocol in an LTE system to which an embodiment of the present disclosure applies.

Referring to FIG. 2, the LTE system wireless protocol includes packet data convergence protocols (PDCPs) 205 and 240, radio link controls (RLCs) 210 and 235, and medium access controls (MACs) 215 and 230 for the UE and ENB, respectively. The PDCPs 205 and 240 are in charge of an operation such as compression/restoration. The RLCs 210 and 235 reconfigure packet data units (PDUs) into a proper size to perform an automatic repeat request (ARQ) operation. The MACs 215 and 230 are connected to several RLC layer devices configured in one UE and multiplexes RLC PDUs into an MAC PDU and demultiplexes RCL PDUs from the MAC PDU. The physical layers 220 and 225 channel-code and modulate higher layer data into OFDM symbols, transmit the OFDM symbols through a wireless channel or demodulates OFDM symbols received through a wireless channel, channel-decodes and transfers the same to a higher layer.

Figure 3:
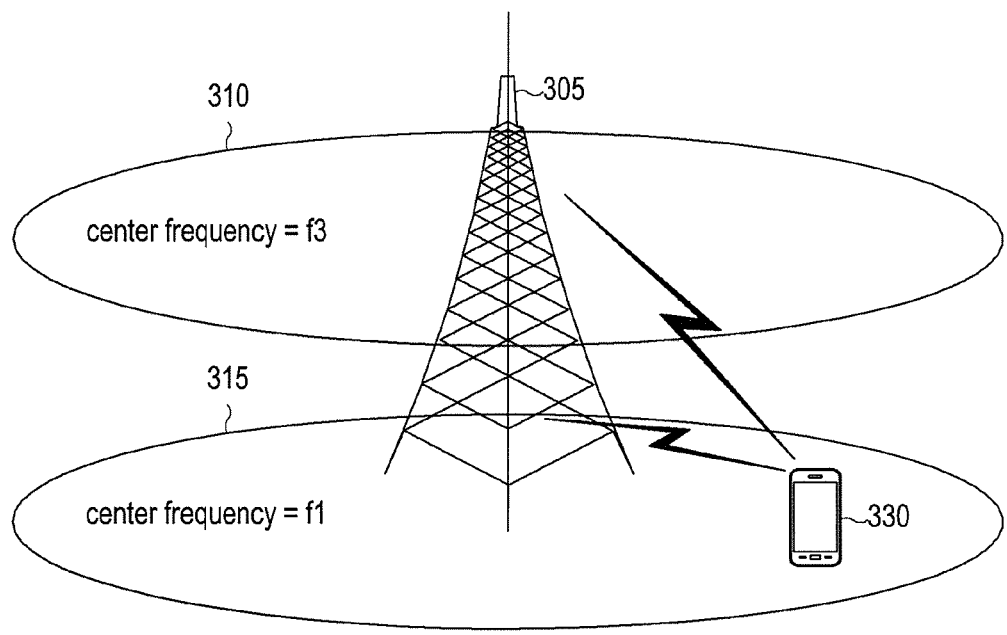
FIG. 3 illustrates carrier aggregation in an LTE-A base station to which an embodiment of the present disclosure applies.

FIG. 3 illustrates carrier aggregation in an LTE-A base station to which an embodiment of the present disclosure applies.

Referring to FIG. 3, one base station generally transmits and receives multiple carriers over several frequency bandwidths. For example, when a carrier 315 with a forward center frequency f1 and a carrier 310 with a forward center frequency f3 are transmitted from the base station 305, one UE conventionally communicates data using one of the two carriers. However, a carrier aggregation-enabled UE can communicate data through a number of carriers at the same time. The base station 305 can increase the transmission speed of the UE 330 by allocating more carriers to the carrier aggregation-enabled UE 330 depending on circumstances. As described above, aggregation of a forward carrier and backward carrier transmitted and received by one base station is referred to as intra-base station carrier aggregation. However, in some cases, unlike that shown in FIG. 3, it can be needed to aggregate forward and backward carriers transmitted and received by different base stations.

Figure 4:
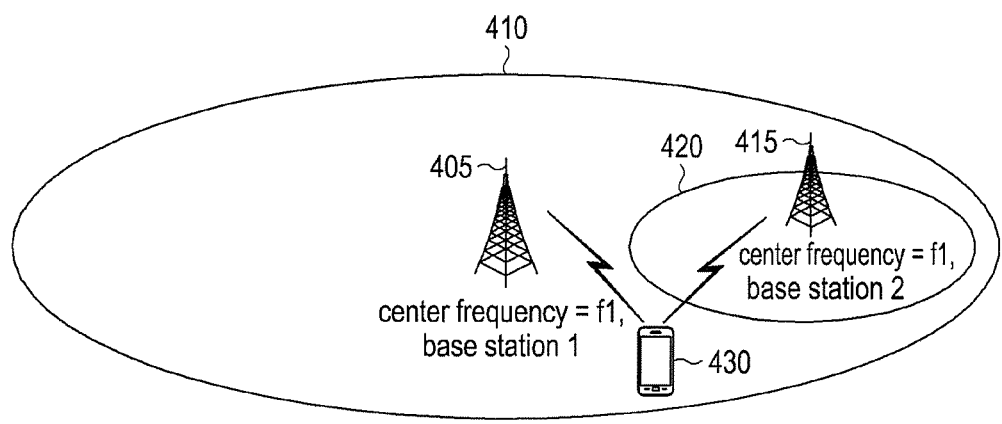
FIG. 4 illustrates the dual connectivity between base stations to which an embodiment of the present disclosure applies.

FIG. 4 illustrates the dual connectivity between base stations to which an embodiment of the present disclosure applies.

Referring to FIG. 4, when a base station 1 (macro cell base station or MeNB) 405 communicates a carrier with a center frequency f1, and a base station 2 (small cell base station or SeNB) 420 communicates a carrier with a center frequency f2, if a UE 430 aggregates the carrier with the forward center frequency f1 and the carrier with the forward center frequency f2, it ends up one UE aggregating carriers communicated by two or more base stations. In an embodiment of the present disclosure, this is denoted inter-ENB carrier aggregation or dual connectivity.

Hereinafter, the terms used herein are described.

In a traditional sense, when one forward carrier transmitted from one base station and one backward carrier received by the base station constitute one cell, carrier aggregation can be appreciated as a UE communicating data through several cells at the same time. Accordingly, a maximum transmission speed is increased in proportion to the number of carriers aggregated. Thus, a "UE receives data through a forward carrier or transmits data through a reverse carrier" identically means that "data is communicated using a control channel and data channel corresponding to a frequency band and center frequency specifying the carriers. Therefore, the carrier aggregation in the legacy 3GPP release 10 standards is the same in notion as configuring a plurality of serving cells, which can be divided into primary serving cells ("PCell") and secondary serving cells ("SCell") depending on the role of each serving cell. The PCell is a main serving cell in charge of access of a UE to a network and mobility, and the SCell is a serving cell additionally configured upon carrier aggregation to increase the uplink/downlink speed of the UE and is primarily used to transmit user data.

In dual connectivity, a set of serving cells is newly defined as follows.

Serving cells of the macro base station (PCells and SCells for carrier aggregation) are separated into a primary cell group (PCG) and serving cells (SCells, etc.) of the small cell base station (secondary cell group, SCG). The PCG means a set of serving cells controlled by a macro base station (hereinafter, a "master base station" or "MeNB") controlling the PCell. By contrast, the SCG means a set of serving cells controlled by a base station (hereinafter, a "secondary base station" or "SeNB") that is not a base station controlling the PCell. Information on whether a predetermined serving cell belongs to the PCG or SCG is sent from the base station to the UE while configuring the serving cell.

A major purpose of using such terms is to make a distinction as to whether some cell is controlled by a base station controlling a PCell of a particular UE. The operations of the UE and the cell can be varied depending on whether the cell is controlled by the base station (MeNB) controlling the PCell of the particular UE or not (SeNB).

FIGS. 5A to 5F illustrate scenarios where an LTE small cell network can be formed using an unlicensed band according to embodiments of the present disclosure.

A licensed band denotes a frequency band for which an exclusive license is awarded a particular business entity to allow provision of a particular radio service. By contrast, an unlicensed band or license-exempt band denotes a frequency band open to use of all entities meeting predetermined requirements, without granted to a particular business entity.

The unlicensed band can be used by a small in-house base station to a pico- or microcell-sized urban external base station depending on imposed transmit power limits.

Figure 5A:
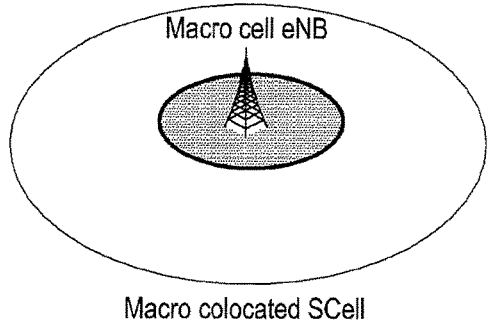
FIGS. 5A to 5F illustrate scenarios where an LTE small cell network may be formed using an unlicensed band according to embodiments of the present disclosure.

In the case shown in FIG. 5A, the shadow area denotes a cell formed using an unlicensed band, and the non-shadow area denotes a cell formed using a licensed band. Shown is an example in which the unlicensed band is used by a Rel-10/11 carrier aggregation technique that uses, as a PCell, the licensed band conventionally used by a macro cell base station and the unlicensed band as an SCell.

Figure 5B:
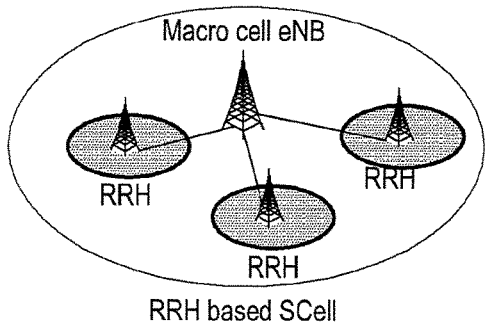

FIG. 5B illustrates an example of a carrier aggregation scheme using a remote radio head (RRH) in Rel-11, in which a macro cell uses the licensed band, and a small cell formed of an RRH uses the unlicensed band.

Figure 5C:
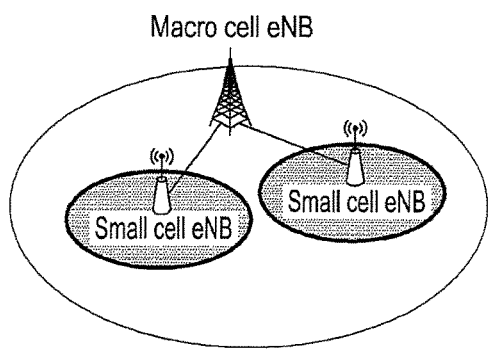

FIG. 5C illustrates an example of using the Rel-12 dual connectivity for a macro base station and a small cell base station, in which the macro base station operates a PCell using the licensed band, and the small cell base station operates a PSCell or special SCell.

Figure 5D:
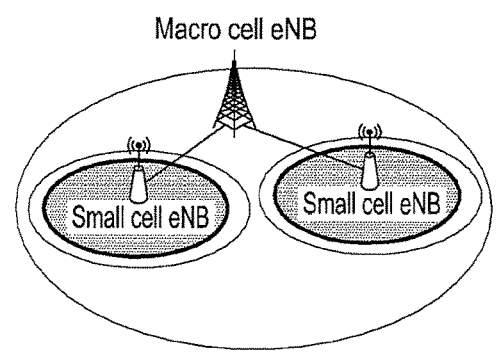

FIG. 5D illustrates an example in which, under a dual connectivity circumstance, a small cell base station uses the unlicensed band as another SCell, like in the example of FIG. 5C, and here, a PSCell forms a cell using other frequency in the licensed band.

Figure 5E:
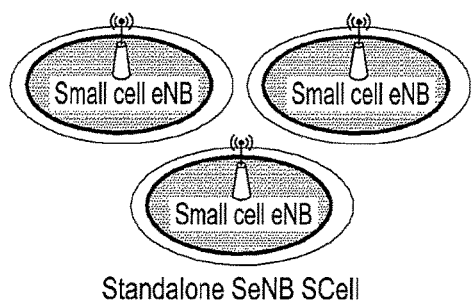

FIG. 5E illustrates an example in which a standalone small cell base station uses the unlicensed band as an SCell.

Figure 5F:
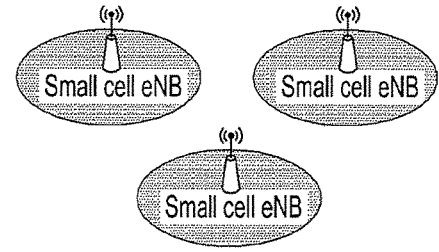

FIG. 5F illustrates an example in which the unlicensed band is used to form a small cell alone.

Figure 6A:
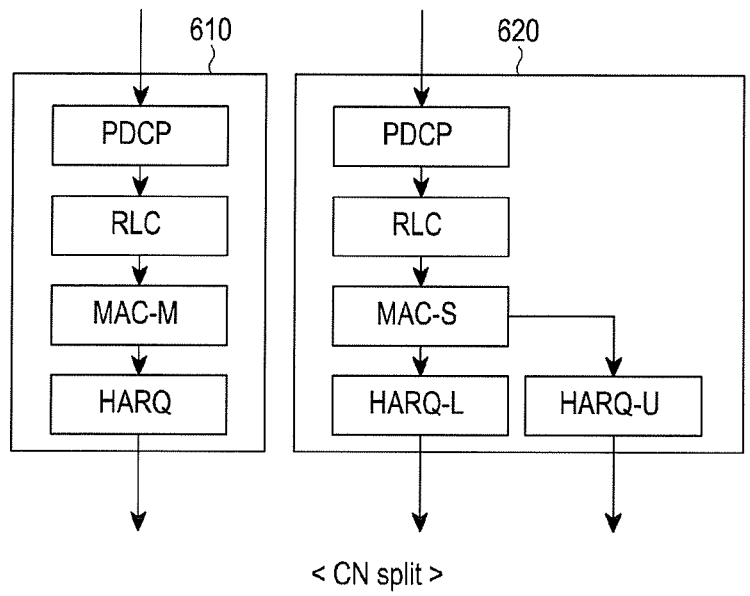
FIGS. 6A and 6B illustrate the protocol structure of a macro base station and a small cell base station using an unlicensed band according to embodiments of the present disclosure.
Figure 6B:
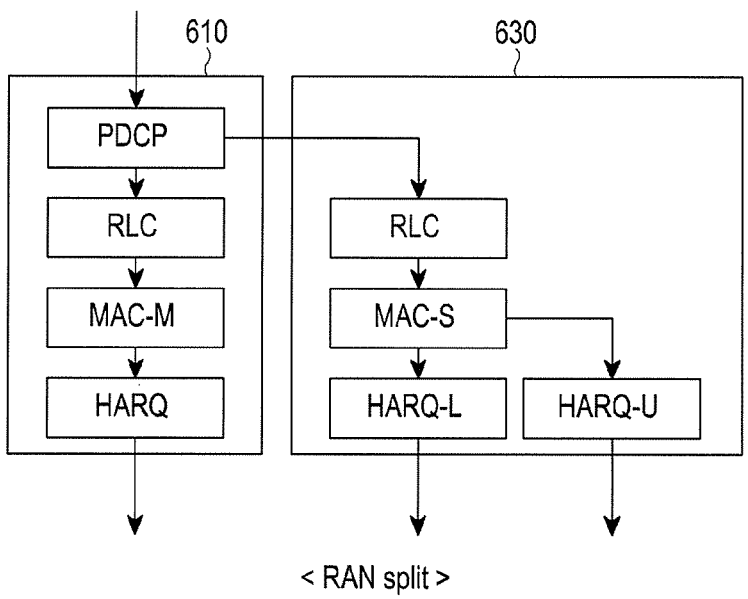

FIGS. 6A and 6B are views illustrating the protocol structure of a macro base station and a small cell base station using an unlicensed band according to embodiments of the present disclosure.

The small cell base station can support the Rel-12 dual connectivity and can largely come in two configurations.

FIG. 6A illustrates a core network (CN) split structure in which user bearers are split in a gateway, and FIG. 6B illustrates an RAN split structure in which user bearers are split in a macro base station.

In the CN split structure, the user bearers are split and configured in the macro base station and the small cell base station, respectively, and thus, as indicated by reference number 610 of FIG. 6a, the overall protocol stack is supported for each base station, starting with the PDCP. The small base station, as indicated by reference number 620 of FIG. 6a, is separated into an HARQ-L for a licensed band carrier and an HARQ-U operating on a carrier for an unlicensed band.

FIGS. 6A and 6B illustrate examples in which under the small cell network scenario using the unlicensed band of FIGS. 5A to 5F, the unlicensed band is used as an SCell in each small cell base station as an example of FIG. 5D.

In the RAN split structure, like indicated by reference number 630 of FIG. 6B, user bears are split in the PDCP of the macro base station and transferred to the RLC layer of the small cell base station. The RLC SDU is transmitted using the carrier-aggregated unlicensed band of the small cell base station.

Figure 7A:
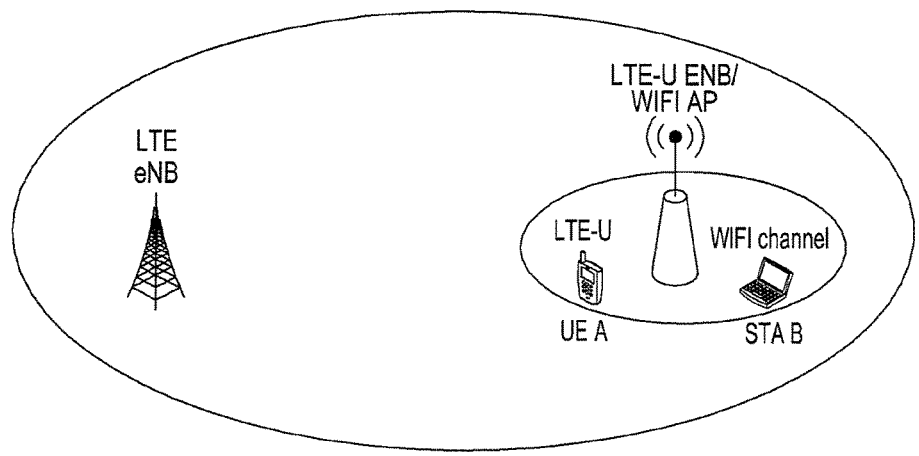
FIG. 7A illustrates an example in which under a heterogeneous network circumstance a small base station uses an unlicensed band LTE (hereinafter, referred to as an "LTE-U")

FIG. 7A illustrates an example in which under a heterogeneous network circumstance a small base station uses an unlicensed band LTE (hereinafter, referred to as an "LTE-U").

The small cell base station can use the LTE-U as a PCell or SCell. The small cell base station can include a legacy wireless local area network (WLAN) access point (AP) in light of utility. In such case, the LTE-U base station, if including the WLAN AP, can operate, with the LTE and WLAN closely associated therewith.

Figure 7B:
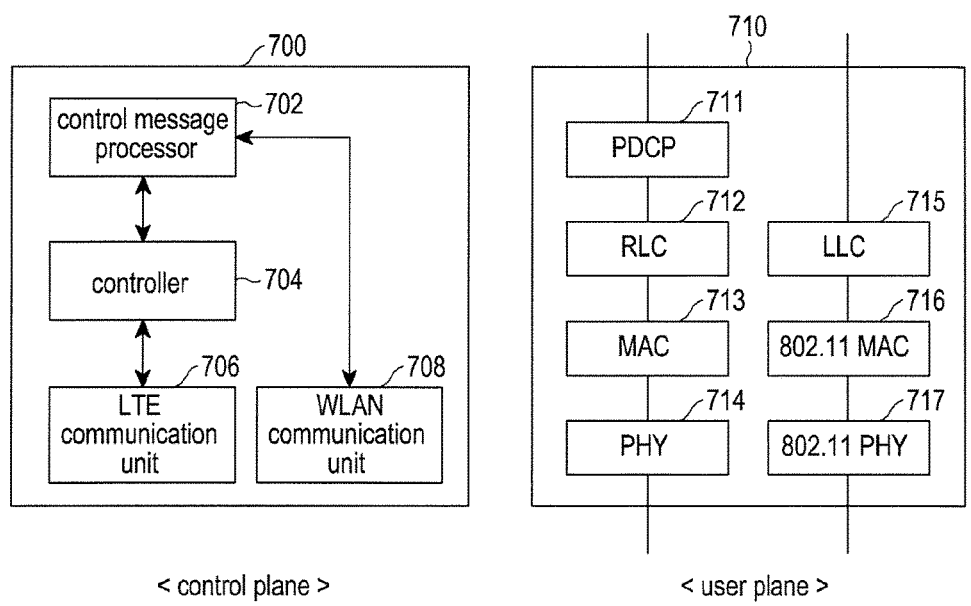
FIG. 7B is a block diagram illustrating an example in which an LTE-U base station includes a WLAN AP.

FIG. 7B is a block diagram illustrating an example in which an LTE-U base station includes a WLAN AP.

The control plane includes a control message processor 702, a controller 704, an LTE communication unit 706, and a WLAN communication unit 708.

In the control plane, the LTE communication unit 706 and the WLAN communication unit 708 each are connected to the control message processor 702. The LTE-U includes the controller 704 for its control on the UE, while the WLAN uses a distributed access technology.

In the user plane, the LTE-U uses the same protocol stacks as the legacy LTE protocol, like indicated by reference numbers 711, 712, 713, and 714 of FIG. 7, and the WLAN can use the physical layer and link layer protocol defined in 802.11, like indicated by reference numbers 715, 716, and 717 of FIG. 7.

Figure 8A:
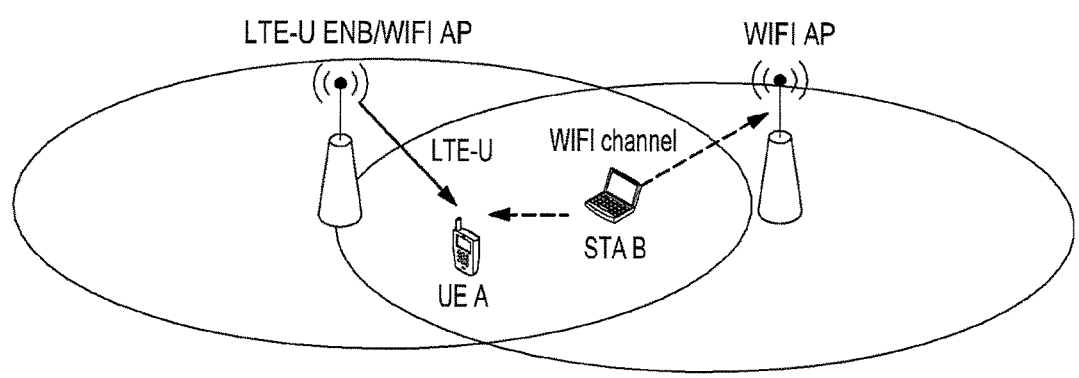
FIGS. 8A and 8B illustrate a method for securing a channel for an LTE-U when a small cell base station includes the LTE-U and a WLAN AP as described above in connection with FIGS. 7a and 7b, according to an embodiment of the present disclosure.
Figure 8B:
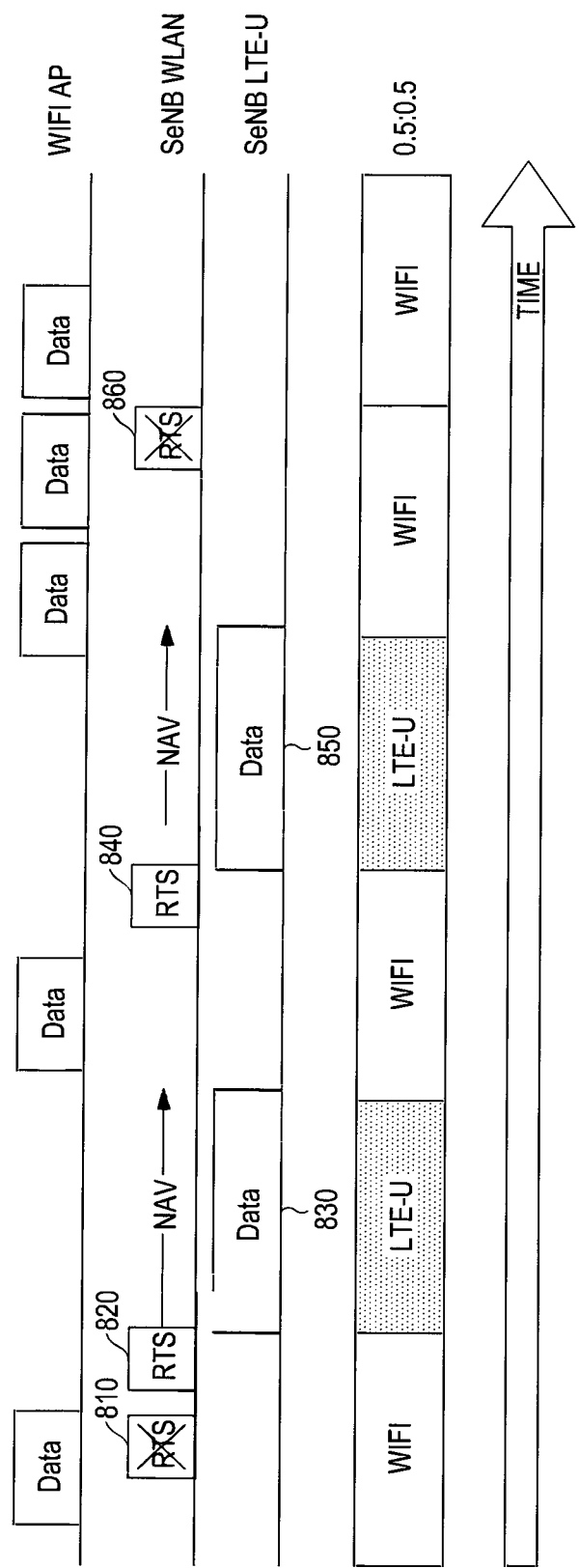

FIGS. 8A and 8B illustrate a method for securing a channel for an LTE-U when a small cell base station includes the LTE-U and a WLAN AP as described above in connection with FIGS. 7a and 7b, according to an embodiment of the present disclosure.

As shown in FIG. 8A, it is assumed that, at the time that the LTE-U base station transmits downlink data to the UE A, a neighboring WLAN terminal STA B transmits uplink data to the WIFI AP to which the STA B is linked. Accordingly, the UE A receives an interference signal from the STA B, suffering from deteriorated reception capability. Since the LTE-U uses an unlicensed band corresponding to a Wi-Fi channel, the LTE-U might always be interfered by the Wi-Fi terminal or WLAN AP.

FIG. 8B illustrates a procedure for previously reserving an LTE-U use duration through a WLAN AP interface owned by a small cell base station according to an embodiment of the present disclosure.

Assuming that an unlicensed band channel evenly split on time is used by the LTE-U and the Wi-Fi, the SeNB WLAN of FIG. 8B attempts to send, e.g., a request to send (RTS) prior to using an LTE-U subframe. As shown in FIG. 8B, the first RTS 810 attempt fails, and a second RTS 820 attempt to send succeeds, thus transmitting data 830 for an LTE-U time.

In the second LTE-U subframe duration, an attempt to send an RTS 840 is made during the previous Wi-Fi time duration, and data 850 is transmitted during the LTE-U duration. However, although an attempt to send an RTS 860 is made before a third LTE-U duration, it collides with data sent from the Wi-Fi AP, resulting in a failure to reserve an LTE-U duration. Accordingly, the LTE-U subframe duration is avoided to allow the Wi-Fi to use the same. Besides the above-described method of previously cutting off the approach of other WLAN terminal or AP using the duration information of RTS, the LTE small cell base station (SeNB) can measure a channel in a particular time duration, i.e., a subframe, and when no signal from the ambient WLAN terminal or other wireless devices is detected, can transmit data during the subframe. In the latter case, the other WLAN terminal or AP senses the channel to operate, and thus, does not present interference. However, the omission of sensing by the LTE-U can lead to a failure to completely avoid the interference due to a mutual collision, resulting in a performance deterioration.

Figure 9A:
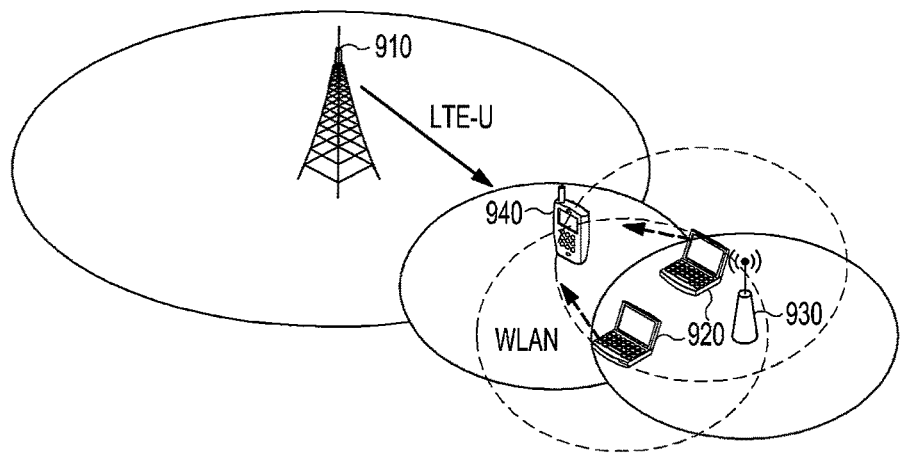
FIGS. 9A and 9B are views illustrating examples of methods by which an LTE-U terminal avoids interference from a neighboring WLAN terminal according to embodiments of the present disclosure.
Figure 9B:
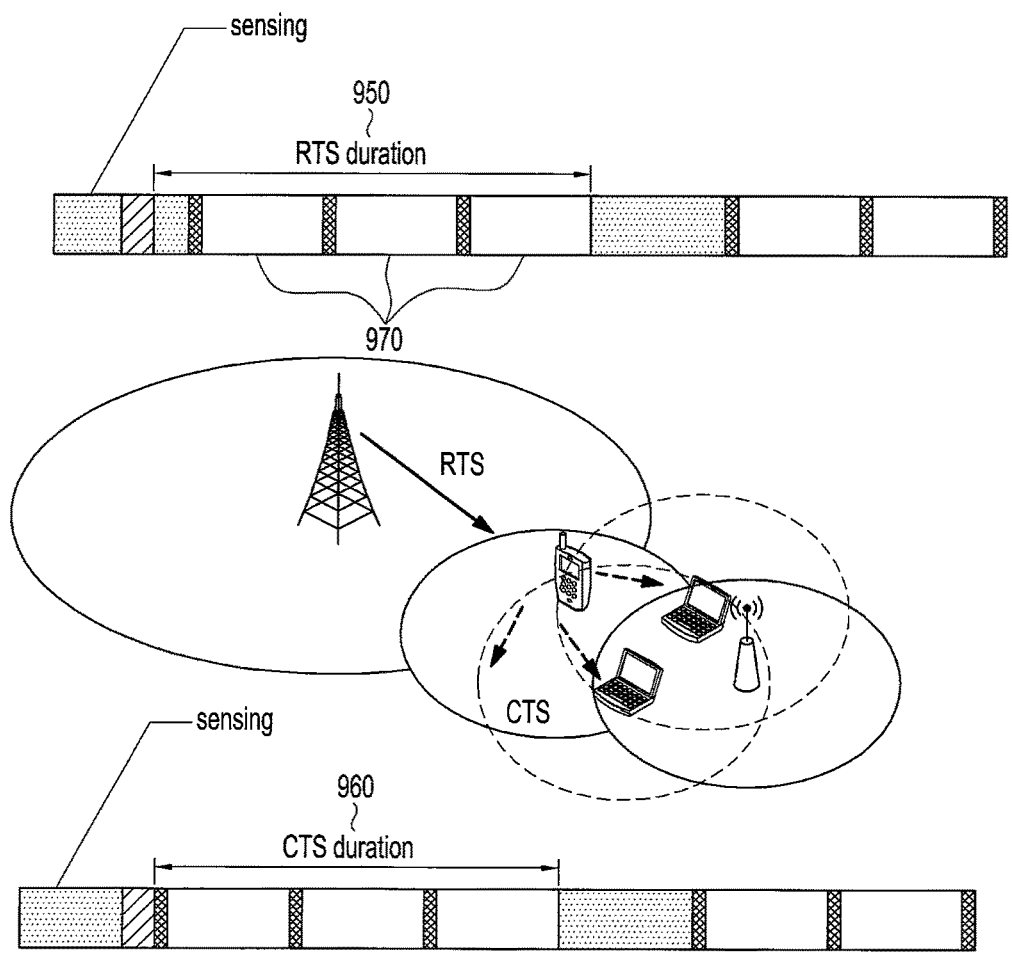

FIGS. 9A and 9B illustrate examples of methods by which an LTE-U terminal avoids interference from a neighboring WLAN terminal according to embodiments of the present disclosure.

As shown in FIG. 9A, when the small cell base station (SeNB) transmits downlink data to the UE, the neighboring WLAN terminal can interfere with the UE. As shown in FIG. 9A, while the SeNB transmits data, the neighboring WLAN STAs are staying away from the coverage of the LTE-U base station 910. Accordingly, the neighboring WLAN terminals, due to a failure to receive corresponding signals, do not take the corresponding channel as occupied when sensing the signals. Thus, the WLAN terminals 920, as shown in FIG. 9A, attempt to transmit uplink data to the WLAN AP 930, causing interference with the UE 940 receiving signals through the LTE-U. Such issue is denoted "hidden terminal problem."

FIG. 9B illustrates a method for previously reserving a channel for a subframe desired to be received by a UE using an RTS or clear to send (CTS) to address the issue of FIG. 9A. FIG. 9B illustrates a process in which an SeNB sends an RTS to schedule the ratio in use of LTE-U to WLAN to be 1:3, for example.

The SeNB makes an attempt to send an RTS in a WLAN subframe prior to an LTE-U duration (three subfames in FIG. 9B) 970. The procedure is the same as in the embodiment illustrated in FIG. 8B. The RTS duration 950 is sent, containing 3 msec and the remaining WLAN time of the time when the RTS is sent. When receiving the same, the LTE-U UE can stop transmission of ambient WLAN terminals by sending a CTS. The CTS duration 960 is the same as the RTS, and thus, a channel can be previously reserved for the following three subframes. Unless the SeNB sends the RTS, scheduling information on the LTE-U subframe can be sent to a higher layer message (i.e., an RRC message) UE. In such case, the UE includes, in the RTS or CTS, information on the duration corresponding to the LTE-U subframe using the scheduling information before the LTE-U subframe and transmits the same.

Figure 10A:
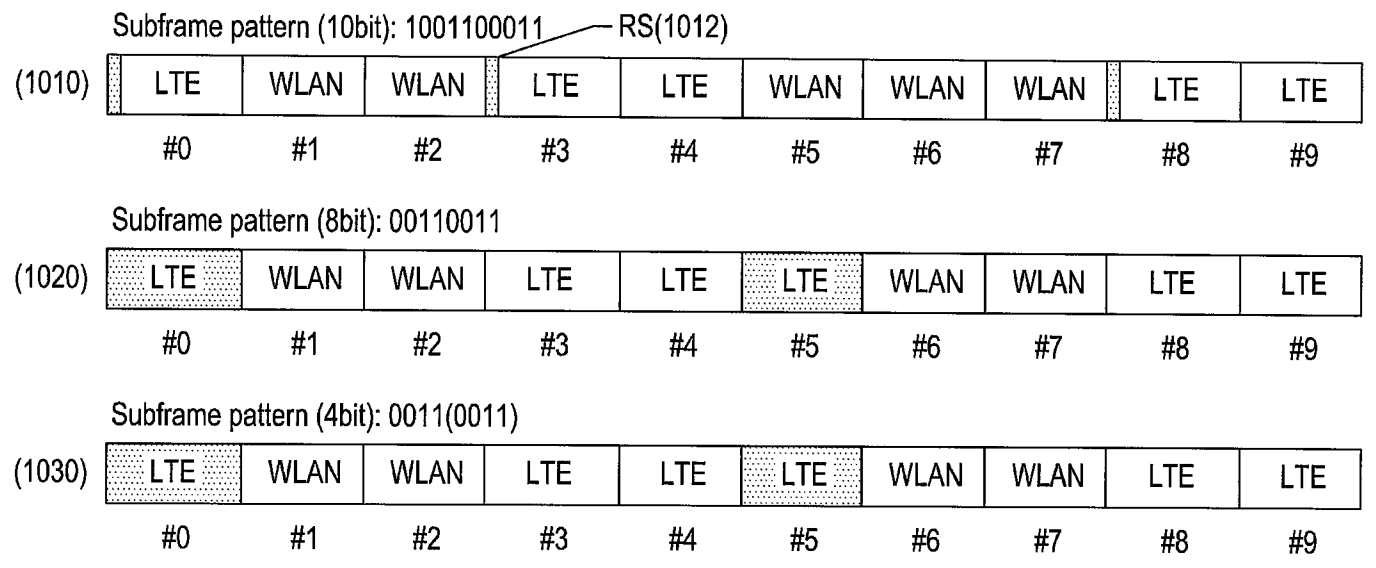
Figure 10B:
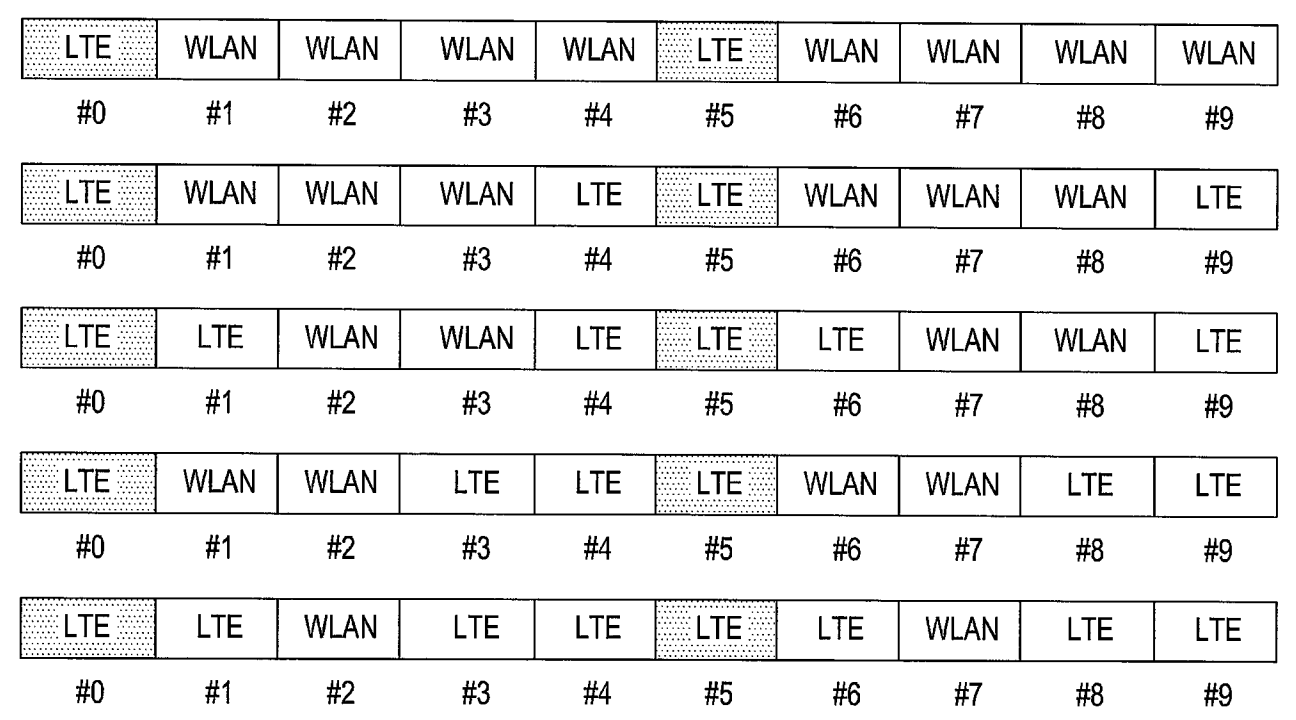
Figure 10C:
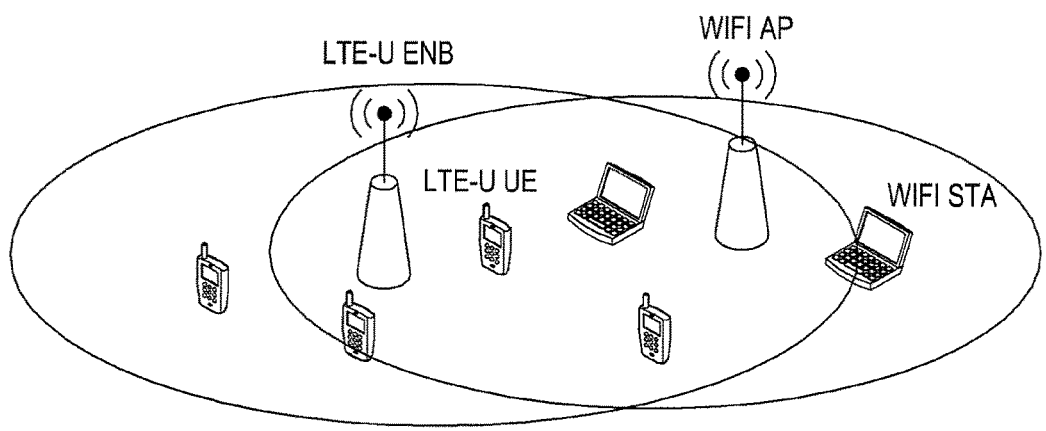

FIGS. 10A and 10C illustrate examples of methods for configuring a subframe for an LTE-U by an SeNB according to embodiments of the present disclosure.

The subframe can be configured by the UE through a higher layer control message, a radio resource control (RRC), or an L1 message (e.g., downlink control information (DCI) 1C). RSs can be transmitted every subframe or at particular periods.

The configuration by the higher layer can be used when the variation in use of ambient WLAN is not quick and can present a lower load. By contrast, the configuration of subframe using the L1 message can be sensitive to variations in traffic of ambient WLAN terminals. Accordingly, when the small cell base station (SeNB) includes a WLAN interface as shown in FIGS. 7A and 7B, whether the configuration is made using the RRC or the L1 message can be determined by measuring ambient WLAN traffic.

The RRCConnectionReconfiguration message can have a format shown in the following Table 1.

TABLE 1

RRCconnectionReconfiguration:
RRC LTE-U IE:
   Lteu-subframe-L1-signal {false, true}
Var(WLAN_load) > threshold
-> RRC signaling with Lteu-subframe-L1-signal = {true}
Var(WLAN_load) > threshold
-> RRC signaling with Lteu-subframe-L1-signal = {false}

When the variation in WLAN load is higher than a particular threshold as described above, the L1 signal in the RRC LTE-U information element (IE) can be set to true, sending the RRCConnectionReconfiguration message to the UE, and otherwise, a message corresponding to false to the UE.

FIGS. 10A and 10C illustrate subframe configuration information included in the RRC or L1 message.

The subframe information can be represented for one radio frame (ten subframes) or several radio frames. FIG. 10A illustrates configuration information on one radio frame. The ten subframes can be represented as 10 BITMAP, and the LTE subframe and the WLAN subframe can be sent, respectively marked with #1 and #0 or vice versa. In the first frame 1010 of FIG. 10a, a reference signal (RS) 1012 can be inserted ahead of each LTE-U subframe, allowing for estimation of a channel for the LTE-U subframe. In an additional embodiment, an RS can be inserted each subframe, enabling the channel estimation for the LTE-U subframe. In an additional embodiment, an RS can be inserted every two or more subframes, enabling the channel estimation for the LTE-U subframe. In an additional embodiment, an RS can be inserted ahead of all of the subframes, enabling channel estimation for the LTE-U subframe.

Of the subframes in the second radio frame 1020, the first subframe #0 and the sixth subframe #5 are set to be exclusively used for LTE-U, for example. In such case, a sync signal can be transmitted through the two subframes, allowing an LTE-U sync to be established through the signal. Channel estimation can be done through the CRS or DRS in each LTE-U subframe. Accordingly, in the second example, 8-BITMAP information corresponding to the other eight subframes than the two subframes #0 and #5 is included in a message that is then transmitted.

The third radio frame 1030 is structured so that five subframes are repeated. Accordingly, 4 BITMAP is included in configuration information that is then transmitted. When sending the configuration information with a smaller number of bits, like in the third radio frame, it can be useful for the case where only limited data, such as the L1 message, can be transmitted.

As described above, the configuration using the bitmap for each subframe can present flexibility upon scheduling but can increase the volume of information. Accordingly, the base station and the UE can exchange only indexes, with a codebook that can be mutually shared for particular subframe patterns. For example, the two patterns of FIG. 10 can be shared as 0 and 1, and the base station, upon configuring the two patterns, can transmit only the index 0 or 1.

The LTE-U pattern shown in FIG. 10A does not support three or more consecutive LTE-U subframes for co-existing with the WLAN. When the LTE-U monopolizes three or more subframes, the quality of WLAN service can be deteriorated. For example, a real-time multimedia service, such as transmitting real-time videos, is sensitive to delay, and thus, the LTE-U's long-term occupation of the unlicensed band can affect the WLAN service. Thus, as shown in FIG. 10a, there can be one, two, or three LTE-U subframes. When three subframes are used for the LTE-U like the second and third radio configurations 1020 and 1030 of FIG. 10, the subframe #0 or #5 where a sync signal is transmitted can be positioned at the end of consecutive LTE-U subframes. This is for maintaining the channel occupation to ensure as stable sync signal transmission as possible. Accordingly, the subframes #0 and #5 can be positioned at the end of the three subframes or in the middle thereof.

FIG. 10B illustrates an example of configuring a subframe according to an embodiment of the present disclosure. FIG. 10B illustrates an exemplary LTE-U configuration and an example configurable according to a WLAN load for subframes #0 and #5 sync signals.

The exemplary configuration shown in FIG. 10B shows a use ratio according to the coexistence of WLAN and LTE-U. It is preferable to allow the LTE-U terminal and WLAN terminal to use the ratio in a fair way. As a method for setting the ratio, such an implementation is easy as to enable LTE-U and WLAN to share the channel on halves. An example scheme is that LTE-U uses odd-numbered subframes and WLAN uses even-numbered subframes or that LTE-U uses the first five subframes while WLAN uses the subsequent five subframes. However, this can be varied depending on the number of terminals or traffic used in the two carriers. First, a distinguishing method by the number of terminals is to allow four LTE-U terminals and two WLAN terminals as shown in FIG. 10c to use it in a ratio of 2:1. Accordingly, LTE-U uses six or seven subframes in the radio frame, and WLAN can use the three or four remaining subframes. To that end, the SeNB counts the number of ambient WLAN terminals or base stations using the WLAN interface. For example, the SeNB can discover the basic service set identification (BSSID) of the WLAN terminals to count the number.

Another possible exemplary method is to use a remaining volume except the channel usage by WLAN. In this case, LTE-U considers WLAN users as primary uses and passively uses the unlicensed band. Given that WLAN is an existing "primary user" using the unlicensed band, this is a WLAN-friendly method for using the unlicensed band. For this, the SeNB performs a channel scanning procedure as shown in Table 2.

TABLE 2

Power on. Sensing; If medium is busy, go to another channel
If free channel exist, start to transmit Beacon.
If free channel does not exist, go to the channel which is least busy.
Inform eNB about the load situation(how much portion of medium it can occupy) if there
is no idle channel.

As in the above procedure, the SeNB first conducts a scanning procedure to find a channel with no neighboring WLAN terminal, and when there is no empty channel, chooses a WLAN channel having the smallest load. As a method for measuring a load, the BUSY TIME of channel can be estimated by periodic sensing through the LTE-U interface or can be estimated using channel utilization information contained in a beacon message transmitted from the ambient WLAN AP. In the former case, the channel can be arbitrarily measured during an OFF period according to discontinuous reception (DRX) to estimate a channel load. In the latter case, the SeNB can collect beacon signals from ambient WLAN APs through the Wi-Fi interface to estimate the load of the current channel. Per-UE subframes can be calculated through the load thusly estimated and Number of subframe per UE=((1−channel_load)/UEs)*10. Of course, multiple UEs can be scheduled in LTE-U subframes.

Figure 11A:
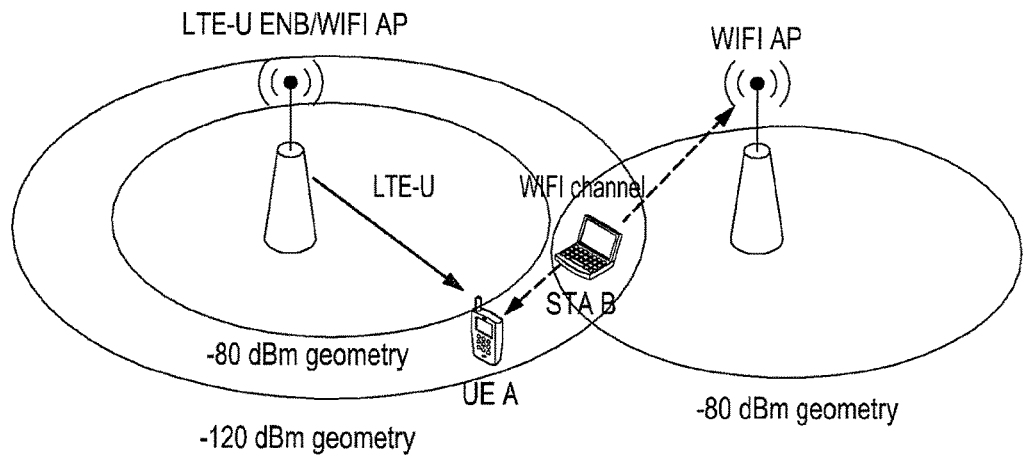
FIGS. 11A and 11B are views illustrating radio resource management (RRM) for LTE-U according to an embodiment of the present disclosure.
Figure 11B:
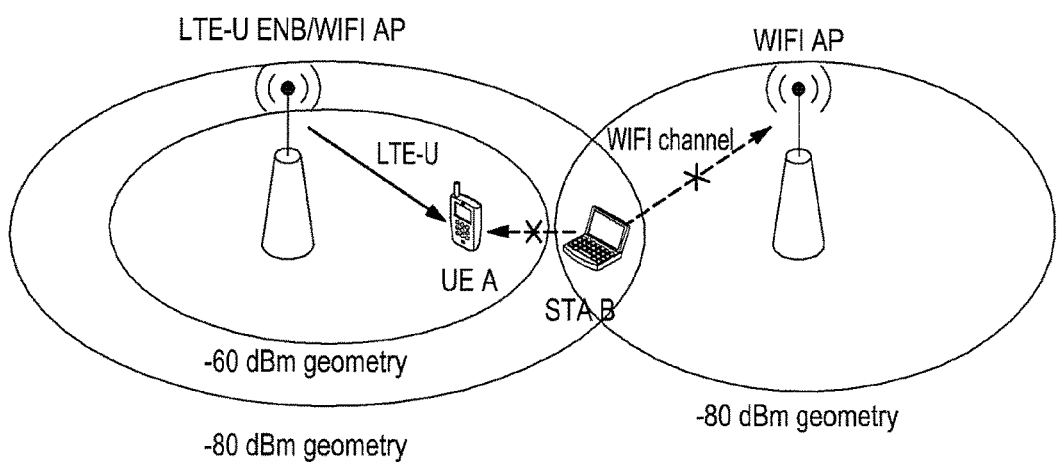

FIGS. 11A and 11B illustrate the radio resource management (RRM) for LTE-U according to an embodiment of the present disclosure.

The measurement of signal quality of a terminal for a cell corresponding to LTE-U operates RRM based on the signal measured only in the LTE-U subframes of the LTE-U subframes and the Wi-Fi subframes as in the embodiments of FIGS. 10A and 10C. The SeNB, upon adding or removing the SCell to use LTE-U, can operate based on the RS signal measured in the LTE-U subframe. For example, when an LTE-U terminal, UE A, is positioned in an edge area of a small cell as shown in FIG. 11A, it can be interfered by an ambient WLAN terminal, STA B. In the case of LTE-U, small cell coverage can operate at a lower sensitivity level, e.g., −120 dBm, but does not operate at −80 dBm or less due to a relatively high WLAN sensitivity level. Accordingly, when evaluating the clearance of channel with a sensing operation, in the case of operating at −62 dBm or more for energy detection and at −82 dBm or more for clear channel assessment (CCA), WLAN determines that the channel is occupied by someone else and stops signal transmission while operating a random backoff operation. In contrast, since LTE-U can operate even at −120 dBm, in case UE A is positioned at the cell boundary as shown in FIG. 11A, STA B determines that the channel is not occupied due to an ambient low LTE-U signal strength and continues to communicate with the Wi-Fi AP. Accordingly, UE A keeps being interfered by STA B, resulting in a deteriorated reception performance. Such case presents a reduced carrier aggregation effect using the unlicensed band in the small cell and causes a deterioration of performance due to, e.g., reordering or re-transmission issue as compared with when carrier aggregation is not performed. Accordingly, in the above case, it is better off to previously prevent addition of an SCell using LTE-U for UE A. Thus, UE A abstains from adding a cell for the unlicensed band having a reception signal quality of −80 dBm or −62 dBm or less based on the signal quality measurement results for LTE-U subframes. FIG. 11b illustrates an example in which an SeNB transmits a control message, such as, an RTS, using a WLAN interface to avoid interference from an ambient WLAN terminal. In this case, STA B can sense up to −82 dBm with a WLAN CCA, and thus, STA B does not cause interference with LTE-U UE-A as shown in FIG. 11B.

As the number of small cells is soaring, the number of LTE-Us that can be added to the SCell is predicted to increase. Thus, all the cells should be reported to the macro base station for the LTE-U signal received by the terminal, UE. This prompts excessive uplink transmission for the UE and causes measurement and reporting procedures for unnecessary cells. Thus, the macro base station, when determining a measurement configuration for the terminal, can set a threshold for the frequency corresponding to LTE-U. When the signal strength measured for the LTE-U cell within the unlicensed band frequency based on the threshold is not more than the threshold, the terminal gets rid of the cell from the measurement cell list. By doing so, the load of measurement reporting and the load of uplink channel can be reduced.

In the LTE system, the measurement gap period is set to 60 msec or 80 msec, and the actual measurement gap is 6 msec. The terminal does not use the current cell during the period to measure the signal quality of the cells positioned in other frequency region. Further, since in Rel-10/11 CA measurement is operated based on the terminal, the SCell operation also stops operating for communication in the measurement gap. Accordingly, unnecessary resource waste can be reduced by setting the measurement gap with Wi-Fi subframes in the LTE-U SCell. For example, a subframe configuration having a higher Wi-Fi subframe ratio is set to the terminal, thus allowing WLAN to use the subframes during the measurement gap period. In light of compensation of the same, a radio frame with a higher LTE-U subframe ratio can be set after the measurement gap is terminated.

In order to measure an LTE-U SCell signal in the RRM operation, the LTE-U signal for the LTE-U subframe can be measured while an interference signal of an ambient WLAN terminal can be simultaneously measured in the Wi-Fi subframe. Thus, the UE sends transmissions to the base station, SeNB, with the reception value for the LTE-U signal distinguished from the signal value received from other unlicensed band wireless device. Thus, the base station can conduct a procedure of removing and re-adding SCells to the frequency region having a small interference signal strength of other unlicensed band that is measured during the measurement gap when the ambient WLAN signal strength is larger. The LTE-U base station can set a particular WLAN subframe to a measurement subframe to measure WLAN interference. The setting can be made by a higher layer through an RRCConnectionReconfiguration, and the terminal should measure and report an interference signal only in the Wi-Fi subframe designated according to the setting.

Figure 12A:
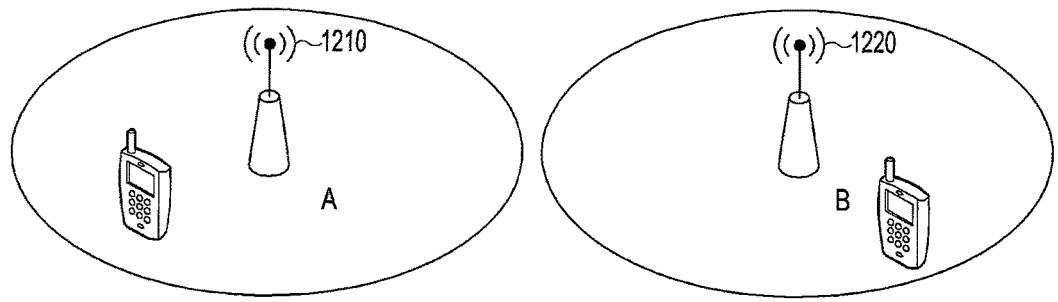
FIGS. 12A and 12B are views illustrating examples of interference between LTE-U base stations according to embodiments of the present disclosure.
Figure 12B:
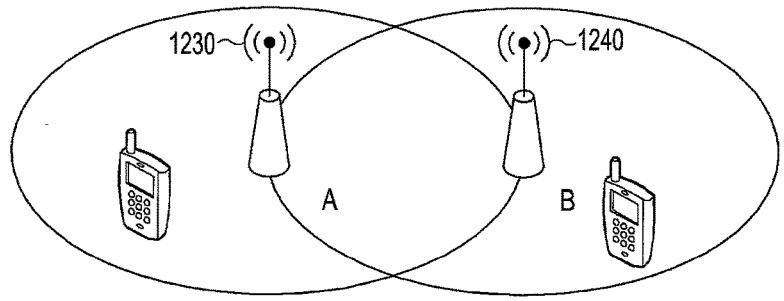

FIGS. 12A and 12B illustrate examples of interference between LTE-U base stations according to embodiments of the present disclosure.

FIG. 12A illustrates an example in which other network operating LTE-U is not positioned adjacent between the cells, and FIG. 12B illustrates an example in which the two cells are positioned adjacent to each other. In the example of FIG. 12A, in a case where the LTE-cell is installed by other operator, when the LTE-U base station sends signals by base station scheduling, not by a channel access scheme through sensing, mutual interference occurs. In the example of FIG. 12a, installation of the small cell in the same operation network other than the other operation can avoid the mutual interference. In this case, when the WLAN terminal is positioned at the middle between the two base stations, it can interfere with the two base stations. When base station A 1210 and base station B 1220 configure LTE-U subframes by their respective scheduling, they are highly likely to be subject to mutual interference. Assuming that the WLAN terminal sends data in the second and third subframes as shown in FIG. 12A, for example, when base station A 1210 sends a signal in the first and second subframes, and base station B 1220 sends data in the third and fourth subframes, base station A 1210 and base station B 1220 each collide with WLAN in one subframe, and the WLAN terminal cannot be avoided from interference from base stations A and B in the two subframes. Accordingly, when base station A 1210 and base station B 1220 are used, allocated to the same subframe, mutual interference occurring due to the ambient WLAN can be minimized. Of course, when the WLAN terminal interferes with only a particular base station, no sync between the two base stations can be required. However, since in a dense area, such as a hotspot, WLAN terminals can be highly populated and there can be a number of WLAN terminals over the two base stations, keeping the two base stations synced with each other for LTE-U subframes can lessen the mutual interference. For this purpose, the base station of the same network operator can perform the LTE-U subframe sync through inter-base station communication through the X2 interface. For the illumination sensor, the LTE-U subframe RRC IE message transmitted to the terminal can be transmitted using a message container corresponding to the X2 interface.

FIG. 12B illustrates an example in which two LTE-U base stations overlap.

When base station A 1230 and base station B 1240 have an overlapping area, base stations A and B can schedule subframes. LTE-U subframe scheduling information of the neighboring base station can be obtained through the X2 interface, and a mute operation can be conducted in the subframe, minimizing the inter-cell interference. FIG. 12*b* illustrates an example in which LTE-U base stations A and B evenly share resources with WLAN. Inefficient use of the resources can occur depending on the number of UEs linked to the base station and the number of WLAN terminals.

Taking the inter-base station operation as an example as shown in FIG. 12B, when LTE-U base station A periodically sends data in the first subframe, base station B, when the reception performance in the subframe is deteriorated, detects an TLE feature for the subframe. For example, it is grasped whether there is an LTE dependent signal such as a reference pattern. Base station B senses that there is other base station A in the first subframe and conducts a mute operation in the subframe. Since there is only a WLAN signal in the second subframe as shown in FIG. 12A, the subframe is used by base station B. In such a way, each LTE-U base station and WLAN can share the channel through distributed control. The distributed control scheme can apply when base stations A and B belong to different network operators. When the two operating entities configure an interface between the two base stations A and B, subframe configuration information from each base station is exchanged through the X2 interface as described above in connection with FIG. 12*a*, goes through a negotiation procedure for proper configuration, and is finally configured using an RRC message in the terminal.

Figure 13A:
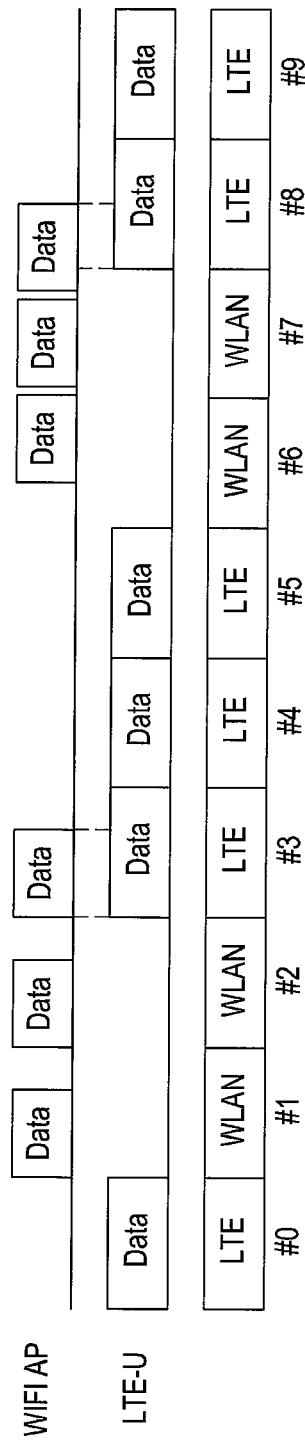
FIGS. 13A and 13B are views illustrating sharing methods between LTE-U and WLAN using a listen before talk (LBT) operation according to embodiments of the present disclosure.
Figure 13B:
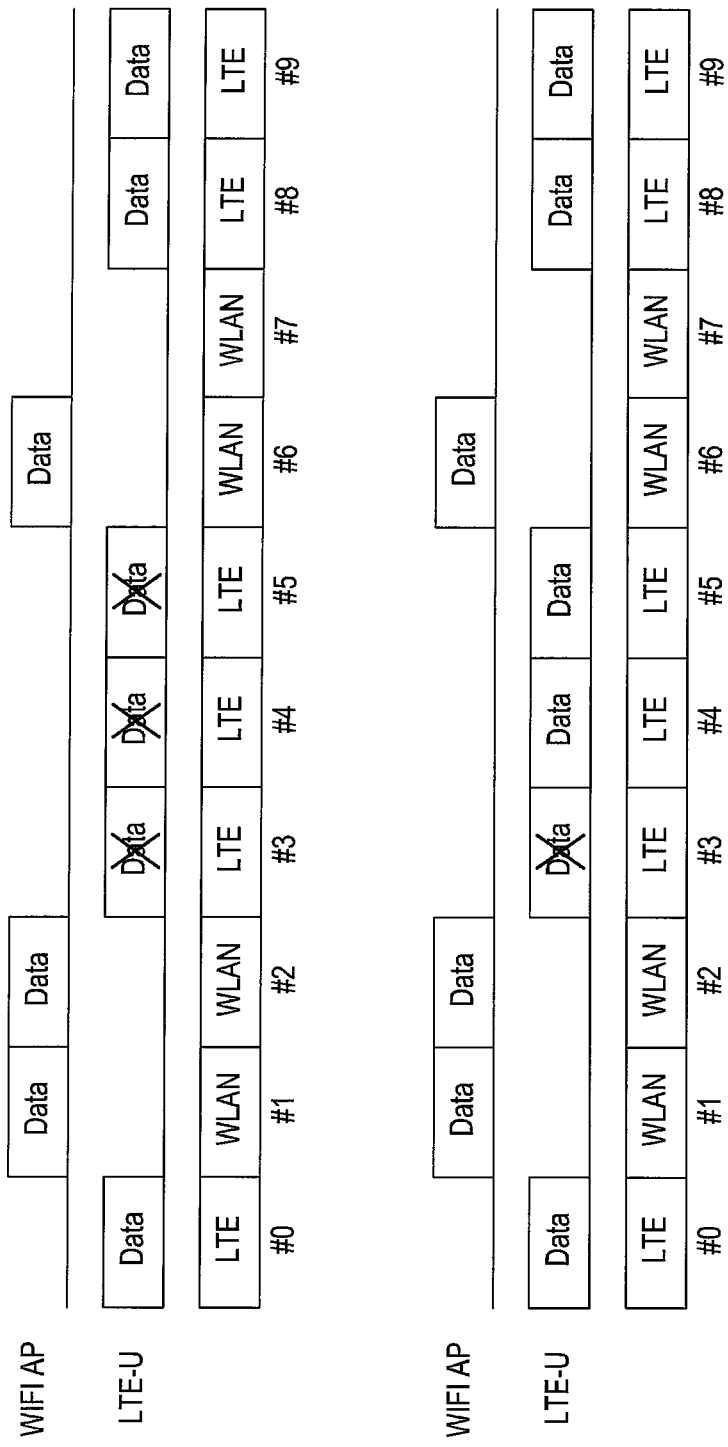

FIGS. 13A and 13B are views illustrating sharing methods between LTE-U and WLAN using a listen before talk (LBT) operation according to embodiments of the present disclosure.

FIG. 13A illustrates an LTE-U small cell base station that does not conduct an LBT operation. The Wi-Fi AP approaches the channel under the circumstance where the channel is not occupied by a carrier-sense multiple access (CSMA) scheme. By contrast, the LTE-U base station transmits data according to its schedule. When the SeNB transmits LTE data with a subframe schedule setting, although performing data transmission in the first subframe and the Wi-Fi AP being already under transmission of WLAN data at the time of transmitting LTE data in subframe #3, the LTE SeNB sends data. Accordingly, mutual interference occurs between LTE-U and WLAN, and both terminals can fail to receive data. Thereafter, the SeNB continues to send data in subframe #4, and after the data transmission, the Wi-Fi AP sensing that the channel was occupied by LTE-U stops transmission. As in the above example, a collision occurs between WLAN and LTE-U in subframe #8.

FIG. 13B illustrates the structure of a subframe when an LTE-U SeNB operates based on LBT.

As shown in FIG. 13B, the LTE-U base station conducts a channel sensing operation in the WLAN subframe before downlink data transmission in the LTE-U subframe according to the subframe configuration. Thus, when the channel is idle, it transmits downlink data through the LTE-U carrier, otherwise conducts a mute operation during the subframe duration. In the second example, the WLAN signal is sensed in the channel, and in the next subframe, no LTE data is transmitted, and the operation of sensing the channel goes on. When no signal is received from WLAN or other wireless device on the channel, LTE data transmission is resumed. Since the LTE-U base station cannot simultaneously do data transmission and channel sensing, the channel sensing is fulfilled in the WLAN subframe duration or only when no data can be transmitted due to WLAN interference in the LTE-U subframe. The sensing continues during the actual WLAN subframe duration, and the operation is conducted considering the delay of switching from reception to transmission before the LTE-U subframe. Of the two exemplary LBT operations, the first method is simple in operation but has low LTE-U utilization, while the second one is complicated in operation but can have the LTE-U channel occupancy done actively.

Figure 14:
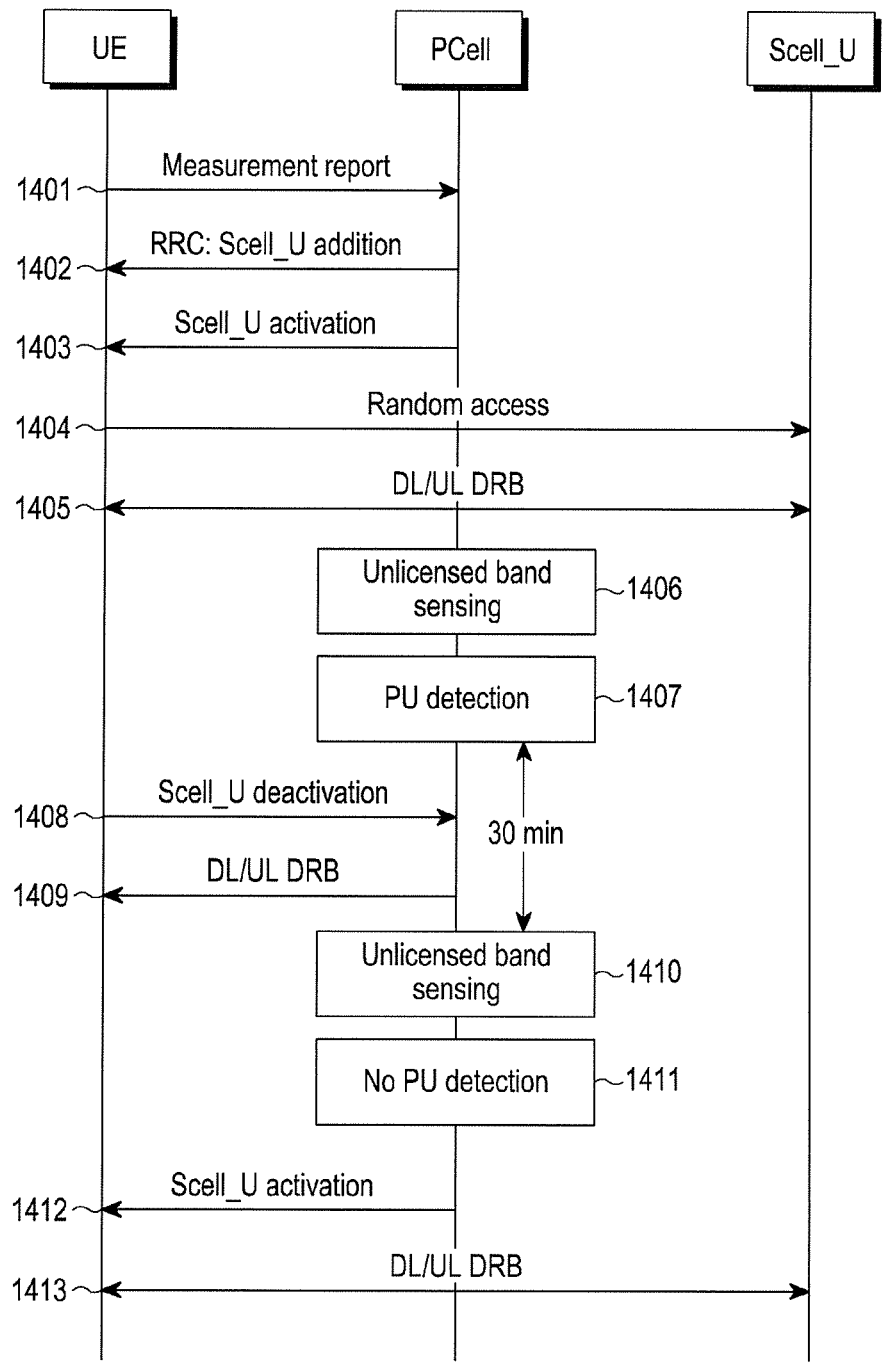
FIG. 14 is a flowchart illustrating a dynamic frequency selection (DFS) operation in a 5 GHz band by an LTE-U base station according to an embodiment of the present disclosure.

FIG. 14 is a flowchart illustrating a dynamic frequency selection (DFS) operation in a 5 GHz band by an LTE-U base station according to an embodiment of the present disclosure.

When the LTE-U base station uses a channel requiring a DFS operation in a 5GH unlicensed band, two operations can be generally taken into account. Because of having to be first used by licensed wireless equipment, primary users (PUs) for the 5GH unlicensed band, e.g., weather forecast radar, military radar, or broadcast equipment, the DFS operation is an operation required to avoid interference from other secondary user equipment or mutual interference between the equipment. LTE-U is a sort of secondary user equipment, and upon discovery of the PU while the channel, should leave the channel empty within a predetermined time.

FIG. 14 is a flowchart illustrating a process for switching data to a PCell upon discovery of a PU.

When the UE sends a measurement report to the PCell in operation 1401, the base station selects an LTE-U SCell that can be added based on the same and sends an SCell addition command to the UE through an RRC message in operation 1402. After adding an SCell through an RRC configuration, the base station sends an MAC CE to the UE for SCell activation in operation 1403, and when receiving the same, the UE activates the wireless device based on the configuration on the SCell and attempts a random access procedure in operation 1404. Thereafter, downlink or uplink user data (e.g., DL/UL DRB) is transmitted through the LTE-U SCell in operation 1405. The PCell should periodically detect primary users (PUs). Accordingly, the PCell continues to sense whether there is a primary user for a particular time (e.g., one minute) to check whether the channel is available as an operation required for the frequency in operation 1406. When sensing a PU in operation 1407, the PCell sends an MAC CE to the UE to deactivate the LTE-U SCell in operation 1408. The UE, when receiving the MAC CE command, deactivates the RF transceiver of the LTE-U SCell. The base station transfers the data radio bearers (DRBs) that are currently being communicated to the PCell using the licensed band and continue communication in operation 1409. After about 30 minutes of unoccupied time, the PCell can determine whether to reuse the unlicensed band through sensing in operation 1410. Accordingly, the PCell rechecks whether the channel can be used on the unlicensed band for a particular time as in operation 1411, and when no PU is discovered, the PCell sends a higher layer message (RRCConnectionReconfiguration) to add an SCell using the unlicensed band to the UE and receives an acknowledgment responsive thereto in operation 1412. After configuring the SCell, the PCell transmits an activation MAC CE to the UE through the SCell to reactivate the cell in operation 1412. The UE splits and transmits DRBs currently being communicated to the SCell using a carrier aggregation technique in operation 1413.

Figure 15:
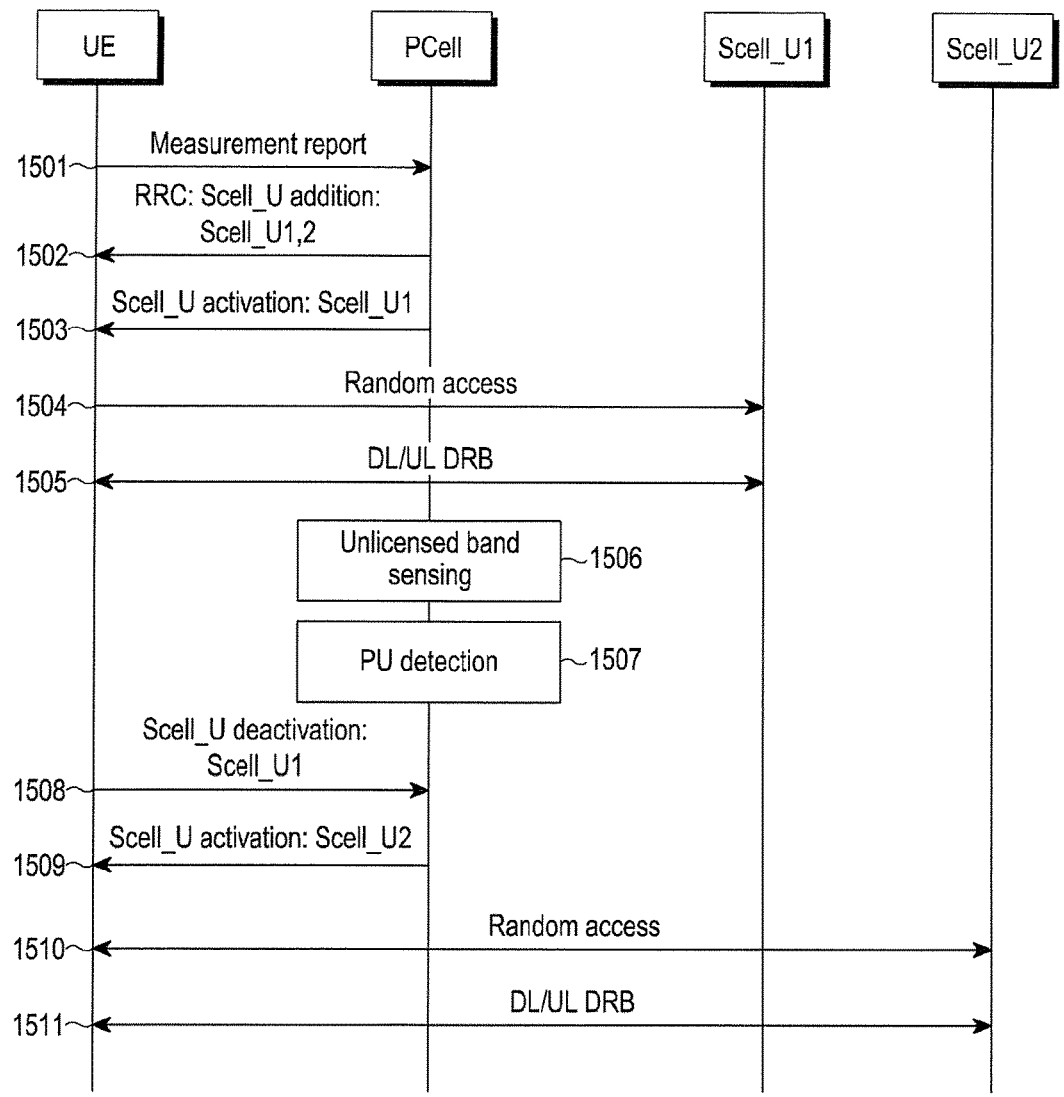
FIG. 15 is a flowchart illustrating an operation for transferring to other LTE-U SCell upon discovery of a PU.

FIG. 15 is a flowchart illustrating an operation for transferring to other LTE-U SCell upon discovery of a PU.

In the fallback-to-PCell scenario as shown in FIG. 14, a shortcoming comes in that the LTE-U SCell cannot be used for a particular period (e.g., 30 minutes). Accordingly, as shown in FIG. 15, the SeNB previously makes an SCell configuration in the UE based on the measurement information on the available LTE-U SCell. When two or more carriers can be carrier-aggregated depending on the UE's capability, multiple LTE-U S Cells can be configured and activated. However, when two carrier aggregation operations can be possible (i.e., a UE having two radio transceivers), the base station can select an SCell having smaller workload and better signal reception quality of the two.

The PCell receives a measurement report request from the UE in operation 1501. The PCell configures LTE-U SCells 1 and 2 in the UE through an RRCConnectionReconfiguration based on the measurement report received from the UE and first activates SCell 1 through the MAC CE in operation 1502. Thereafter, the UE performs carrier aggregation using the SCell in operation 1503, performs random access in operation 1504, and splits and transmits the data of DRBs being currently in use through the SCell in operation 1505. Further, the PCell should periodically check the availability of channel to sense a PU in operations 1506 and 1507. In this case, when the channel is in use by the PU, the PCell deactivates SCell 1 in operation 1508 and activates SCell 2 using the MAC CE in operation 1509. During the process, the data that has been transmitted to SCell 1 can be lost. After SCell 2 is activated, random access is conducted in operation 1510, and the DRBs being transmitted from the PCell are split and transmitted through SCell 2 in operation 1511. As set forth supra, the use of LTE-U SCell can be dynamically done according to the PU's activity of the unlicensed band. However, the small cell, by its nature, can have a highly varying reception signal quality, and thus, repetitive LTE-U SCell management is required based on the measurement report received from the UE, thus resulting in overhead. Accordingly, the above two examples have their own advantages and disadvantages and can be properly applied depending on the UE's moving speed.

Figure 16:
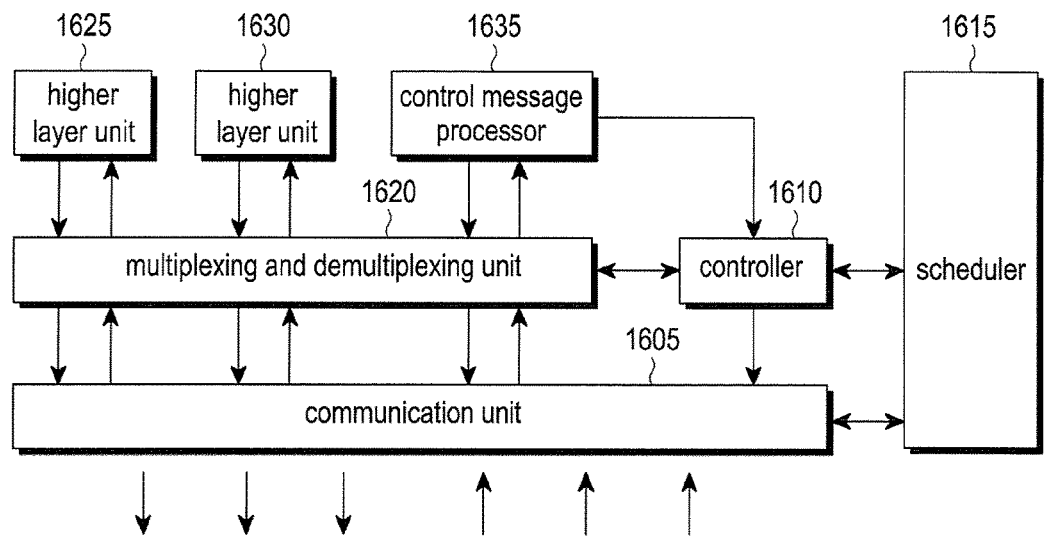
FIG. 16 is a block diagram illustrating a configuration of a base station according to the present disclosure.

FIG. 16 is a block diagram illustrating a configuration of a base station according to the present disclosure.

Referring to FIG. 16, the base station includes a communication unit 1605, a controller 1610, a multiplexing and demultiplexing unit 1620, a control message processor 1635, various higher layer units 1625 and 1630, and a scheduler 1615.

The communication unit 1605 transmits data and a predetermined control signal through a forward carrier and receives data and a predetermined control signal through a backward carrier. When multiple carriers are configured, the communication unit 1605 conducts communication of data and control signals through the multiple carriers.

The controller 1610 can sense whether other wireless devices transmit signals on an unlicensed band to distinguish between busy and idle of the channel.

The multiplexing and demultiplexing unit 1620 multiplexes data generated in the higher layer units 1625 and 1630 or the control message processor 1635 or demultiplexes data received from the communication unit 1605 and transfers the resultant data to a proper higher layer unit 1625 and 1630, the control message processor 1535, or the controller 1510. The controller 1610 determines whether to apply an LTE-U SCell configuration to a particular terminal and determines whether to include the configuration information in an RRCConnectionReconfiguration message.

The control message processor 1635 receives an instruction from the controller and generates an RRCConnectionReconfiguration to be transferred to the UE and transfers the same to a lower layer.

The higher layer units 1625 and 1630 can be configured per UE or service, and can process data generated in a user service such as file transfer protocol (FTP) or voice over Internet protocol (VoIP) to transfer the same to the multiplexing and demultiplexing unit 1620 or processes data transferred from the multiplexing and demultiplexing unit 1620 to transfer the same to a higher layer's service application.

The scheduler 1615 allocates a transmission resource to the UE at a proper time considering, e.g., the buffer state, channel state, and active time of the UE and processes the communication unit to process the signal transmitted from the UE or to transmit a signal to the UE.

Figure 17:
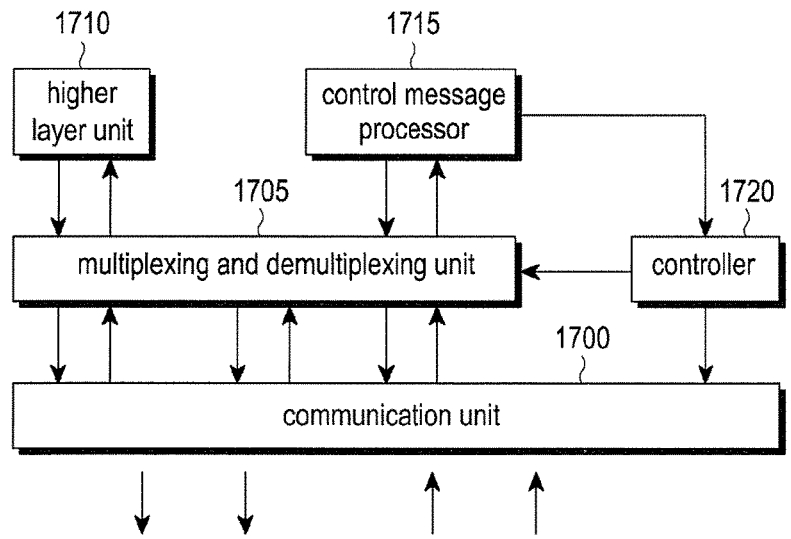
FIG. 17 is a block diagram illustrating a configuration of a user equipment (UE) according to an embodiment of the present disclosure.

FIG. 17 is a block diagram illustrating a configuration of a user equipment (UE) according to an embodiment of the present disclosure.

Referring to FIG. 17, the UE communicates data through a higher layer unit 1710 and communicates control messages through a control message processor 1715. The UE, upon transmission of a control signal or data to the base station, multiplexes the control signal or data through a multiplexer 1705 under the control of a controller 1720 and transmits the same through a communication unit 1700. Further, upon reception of a control signal or data, the UE receives a physical signal through the communication unit 1700 under the control of the controller 1720, demultiplexes the received signal through a demultiplexer 1705, and transfers the demultiplexed data to a higher layer unit 1710 or control message processor 1715 depending on each message information.

A method and apparatus for performing communication using an unlicensed band in a mobile communication system according to an embodiment of the present disclosure can be implemented in hardware, software, or a combination of hardware and software. Such software can be stored in a volatile or non-volatile storage device such as a read-only memory (ROM) or other storage devices, a memory, such as a random access memory (RAM), a memory chip, a device or an integrated circuit, or a storage medium, such as, e.g., a compact disk (CD), a digital video disk (DVD), a magnetic disk, or a magnetic tape, which allows for optical or magnetic recording while simultaneously read out by a machine (e.g., a computer). A method for performing communication using an unlicensed band in a mobile communication system according to an embodiment of the present disclosure can be implemented by a computer or portable terminal including a controller and a memory, and the memory can be an example of a storage medium that can be read out by a machine appropriate to store a program or programs including instructions for realizing the embodiments of the present disclosure.

Accordingly, the present disclosure encompasses a program containing codes for implementing the device or method set forth in the claims of this disclosure and a machine (e.g., computer)-readable storage medium storing the program. The program can be electronically transferred via any media such as communication signals transmitted through a wired or wireless connection and the present disclosure properly includes the equivalents thereof.

An apparatus for performing communication using an unlicensed band in a mobile communication system according to embodiments of the present disclosure can receive the program from a program providing device wiredly or wirelessly connected thereto and store the same. The program providing device may include a memory for storing a program including instructions to enable the program processing device to perform a method for performing communication using an unlicensed band in a mobile communication system and information necessary for the method for performing communication using an unlicensed band in a mobile communication system, a communication unit for performing wired or wireless communication with the program processing device, and a controller transmitting the program to the communication device automatically or at the request of the program processing device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing communication using an unlicensed band by a base station in a mobile communication system, the method comprising:
reserving a channel of the unlicensed band by using a first control frame or higher layer signaling including scheduling information for reservation of a channel of the unlicensed band, the first control frame or the higher layer signaling being received by a terminal supporting the unlicensed band in the mobile communication system; and
transmitting data on the reserved channel of the unlicensed band,
wherein, based on the first control frame or the higher layer signaling, a second control frame is transmitted from the terminal to at least one neighboring terminal supporting a wireless local area network (WLAN),
wherein the second control frame includes duration information corresponding to at least one subframe to be transmitted in the reserved channel of the unlicensed band, and
wherein the reserved channel is reserved in the unlicensed band for transmitting the at least one subframe between the base station and the terminal supporting the unlicensed band.

2. The method of claim 1, wherein the first and second control frames use one of a request to send (RTS) control frame and a clear to send (CTS) control frame, respectively.

3. The method of claim 1, wherein the at least one subframe to be transmitted in the reserved channel of the unlicensed band is transmitted in a form where a reference signal is inserted.

4. The method of claim 2,
wherein the scheduling information includes duration-related information of one of the RTS control frame or the CTS control frame, and
wherein the duration-related information indicates duration corresponding to the at least one subframe.

5. The method of claim 1, wherein the base station transmits the data by using the reserved channel of the unlicensed band corresponding to a WLAN channel.

6. A base station for performing communication using an unlicensed band, the base station in a mobile communication system, the base station comprising:
a transmitter configured to transmit data; and
a controller configured to:
reserve a channel of the unlicensed band by using a first control frame or higher layer signaling including scheduling information for reservation of a channel of the unlicensed band, the first control frame or the higher layer signaling being received by a terminal supporting the unlicensed band in the mobile communication system, and
transmit the data on the reserved channel of the unlicensed band,
wherein, based on the first control frame or the higher layer signaling, a second control frame is transmitted from the terminal to at least one neighboring terminal supporting a wireless local area network (WLAN),
wherein the second control frame includes duration information corresponding to at least one subframe to be transmitted in the reserved channel of the unlicensed band, and
wherein the reserved channel is reserved in the unlicensed band for transmitting the at least one subframe between the base station.

7. The base station of claim 6, wherein the first and second control frame uses one of a request to send (RTS) control frame and a clear to send (CTS) control frame, respectively.

8. The base station of claim 6, wherein the at least one subframe to be transmitted in the reserved channel of the unlicensed band is transmitted in a form where a reference signal is inserted.

9. The base station of claim 7,
wherein the scheduling information includes duration-related information of one of the RTS control frame and the CTS control frame, and
wherein the duration-related information indicates duration corresponding to the at least one subframe.

10. The base station of claim 6, wherein the controller is configured to transmit the data by using the reserved channel of the unlicensed band corresponding to a WLAN channel.

11. A method for performing communication using an unlicensed band by a terminal in a mobile communication system, the method comprising:
receiving, from a base station, a first control frame or higher layer signaling including scheduling information for a reserved channel of the unlicensed band;
transmitting, based on the first control frame or the higher layer signaling, a second control frame to at least one neighboring terminal supporting a wireless local area network (WLAN), the second control frame including duration information corresponding to at least one subframe to be transmitted in the unlicensed band; and
receiving, from the base station, data on the reserved channel of the unlicensed band, and wherein the reserved channel is reserved in the unlicensed band for transmitting the at least one subframe between the base station and the terminal supporting the unlicensed band.

12. The method of claim 11, wherein the first and second control frames use one of a request to send (RTS) control frame and a clear to send (CTS) control frame, respectively.

13. The method of claim 11, wherein the data is transmitted in a form of a subframe, and wherein the subframe is transmitted in a form where a reference signal is inserted in each long term evolution (LTE) subframe to be transmitted in the reserved channel of the unlicensed band.

14. The method of claim 12,
wherein the scheduling information includes duration-related information of one of the RTS control frame or the CTS control frame, and
wherein the duration-related information indicates duration corresponding to the at least one subframe.

15. The method of claim 11, wherein the terminal receives the data by using the reserved channel of the unlicensed band corresponding to a WLAN channel.

16. A terminal for performing communication using an unlicensed band in a mobile communication system, the terminal comprising:
a receiver configured to receive data,
a controller configured to:
receive, from a base station, a first control frame or higher layer signaling including scheduling information for a reserved channel of the unlicensed band;
transmit, based on the first control frame or the higher layer signaling, a second control frame to at least one neighboring terminal supporting a wireless local area network (WLAN), the second control frame including duration information corresponding to at least one subframe to be transmitted in the unlicensed band; and
receive, from the base station, the data on the reserved channel of the unlicensed band, and
wherein the reserved channel is reserved in the unlicensed band for transmitting the at least one subframe between the base station and the terminal supporting the unlicensed band.

17. The terminal of claim 16, wherein the first and second control frames use one of a request to send (RTS) control frame and a clear to send (CTS) control frame, respectively.

18. The terminal of claim 16, wherein the at least one subframe to be transmitted in the unlicensed band is transmitted in a form where a reference signal is inserted.

19. The terminal of claim 17, wherein the scheduling information includes duration-related information of one of the RTS control frame and the CTS control frame, and
wherein the duration-related information indicates duration corresponding to the at least one subframe.

20. The terminal of claim 16, wherein the controller is configured to receives the data by using the reserved channel of the unlicensed band corresponding to a WLAN channel.

* * * * *